US011151481B1

(12) United States Patent
Sun et al.

(10) Patent No.: US 11,151,481 B1
(45) Date of Patent: Oct. 19, 2021

(54) TICKETLESS ENTRY AND TRACKING

(71) Applicant: Amazon Technologies, Inc., Seattle, WA (US)

(72) Inventors: Harry Sun, Mercer Island, WA (US); Ian W Freed, Seattle, WA (US); Joseph Hopkins, Seattle, WA (US); Patrick R Schultz, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 832 days.

(21) Appl. No.: 15/278,595

(22) Filed: Sep. 28, 2016

(51) Int. Cl.
*G06Q 10/02* (2012.01)
*G06Q 20/12* (2012.01)
*G06Q 30/06* (2012.01)
*G06K 9/00* (2006.01)

(52) U.S. Cl.
CPC .......... *G06Q 10/02* (2013.01); *G06K 9/00228* (2013.01); *G06K 9/00288* (2013.01); *G06Q 20/12* (2013.01); *G06Q 30/0635* (2013.01)

(58) Field of Classification Search
CPC .... G06Q 10/02; G06Q 30/0635; G06Q 20/12; G06K 9/00288; G06K 9/00228
See application file for complete search history.

(56) References Cited

U.S. PATENT DOCUMENTS

| | | | | |
|---|---|---|---|---|
| 8,965,170 B1* | 2/2015 | Benea | ................ | H04N 21/4223 386/224 |
| 2004/0221303 A1* | 11/2004 | Sie | ......................... | G06Q 30/02 725/29 |
| 2014/0189720 A1* | 7/2014 | Terrazas | ........... | H04N 21/44218 725/12 |
| 2015/0294515 A1* | 10/2015 | Bergdale | .............. | G06Q 20/045 340/5.61 |
| 2016/0189063 A1* | 6/2016 | Nie | ...................... | G06Q 20/045 705/5 |
| 2017/0188103 A1* | 6/2017 | Pan | ......................... | H04L 67/22 |
| 2019/0050631 A1* | 2/2019 | Hayase | ..................... | G06T 7/38 |

OTHER PUBLICATIONS

J.L. Wayman, Biometric Systems, Springer, ISBN:978-1-85233-596-0 (Year: 2013).*

* cited by examiner

*Primary Examiner* — George Chen
*Assistant Examiner* — Ismail A Manejwala
(74) *Attorney, Agent, or Firm* — Pierce Atwood LLP

(57) ABSTRACT

A system capable of associating tickets with an account to provide ticketless entry to an event. The system may verify that a user is associated with the account using far field verification techniques, such as using facial recognition or by detecting wireless signals. The system 100 may improve a user experience by simplifying the process of entering the event, as the far field verification techniques do not require direct interaction with the user. As a result, the user may access the event without stopping at the entrance to provide proof of purchase (e.g., a physical or electronic ticket, bar code, etc.), proof of identification (e.g., driver's license, passport, biometric scans, etc.) and/or other information.

22 Claims, 19 Drawing Sheets

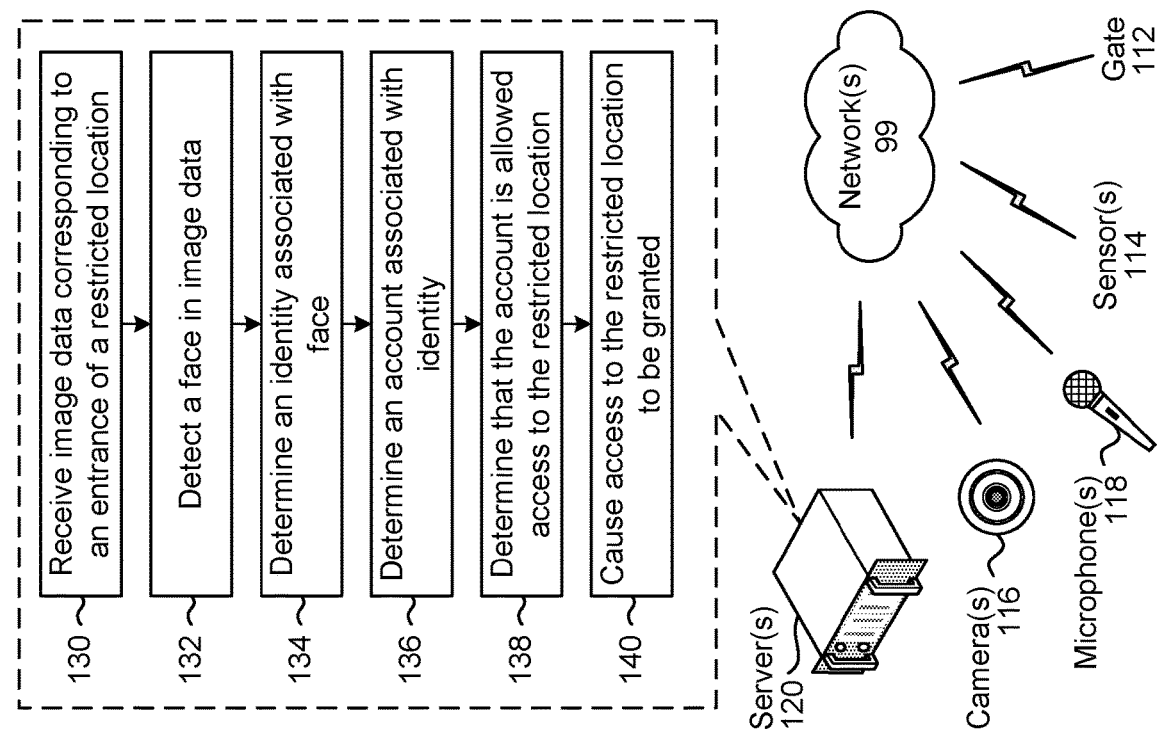
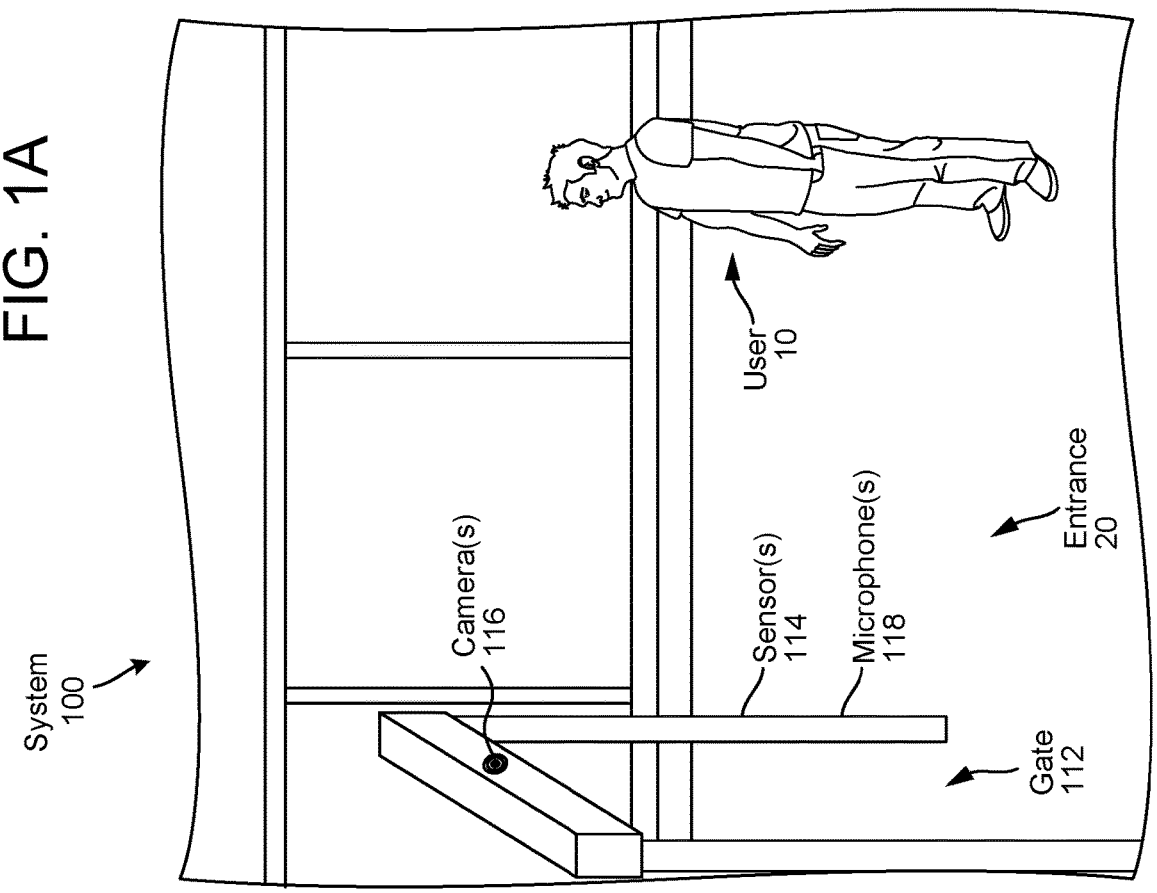
FIG. 1A

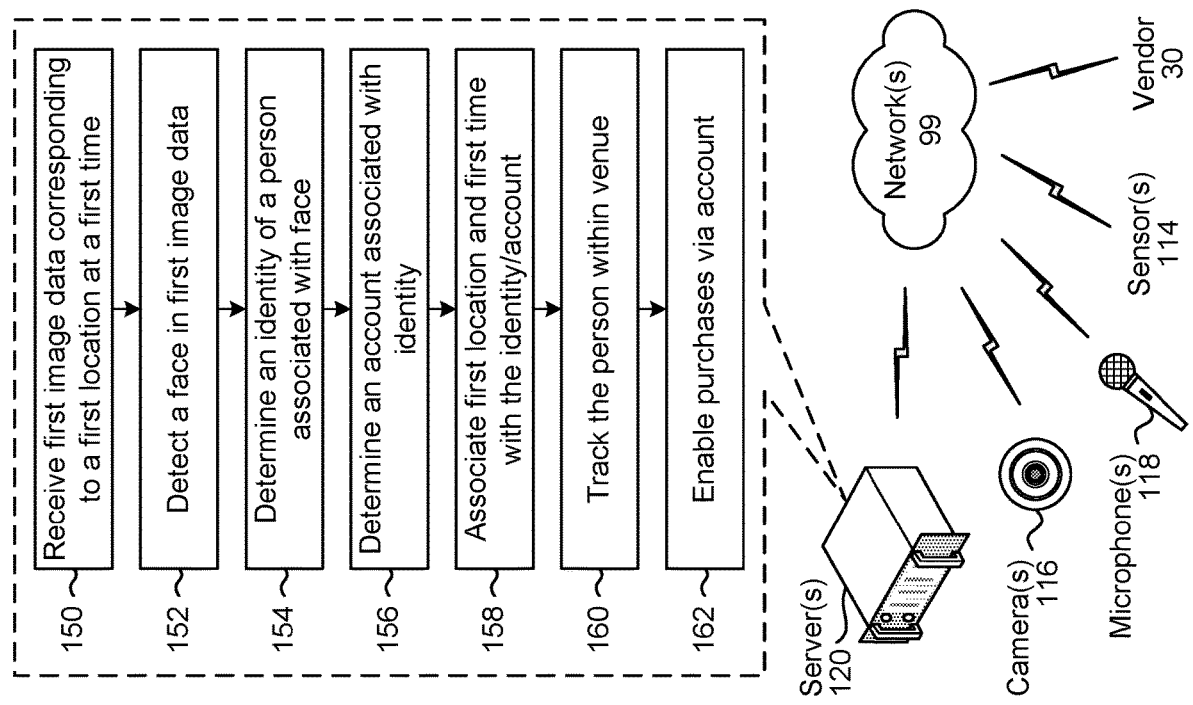
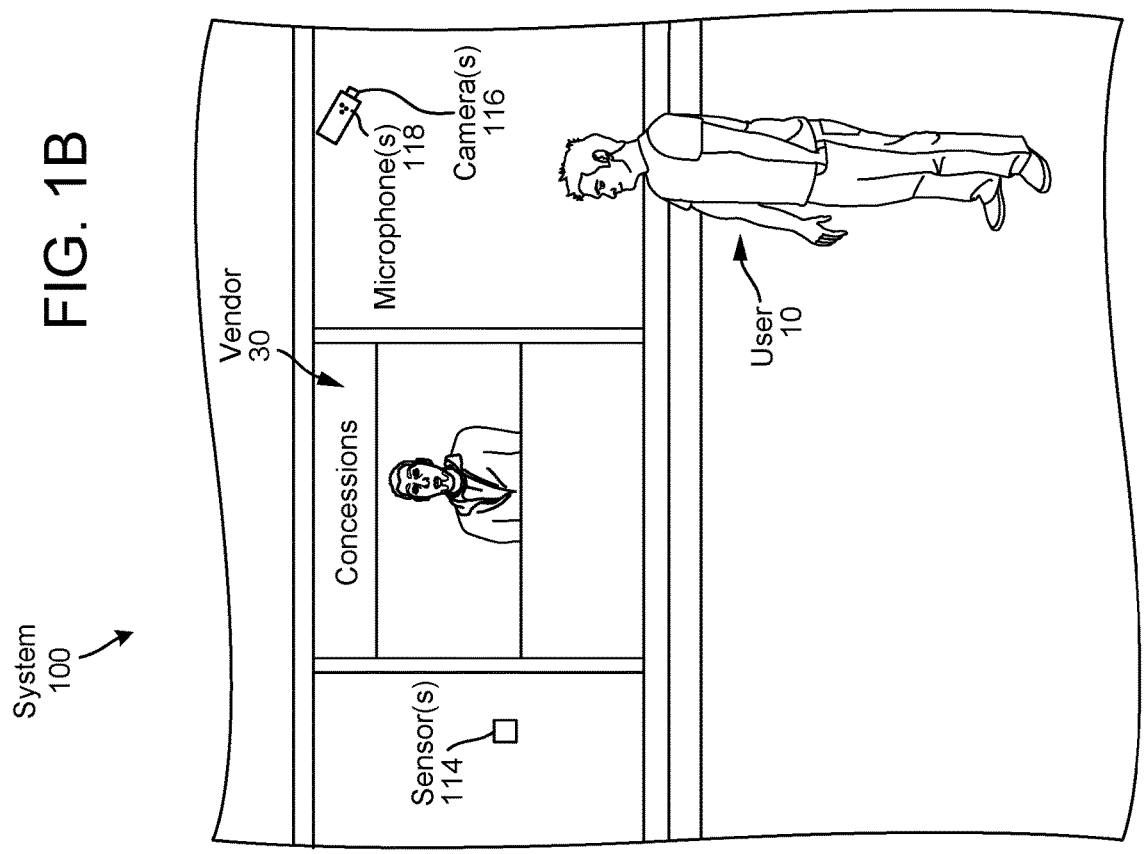
FIG. 1B

FIG. 2A
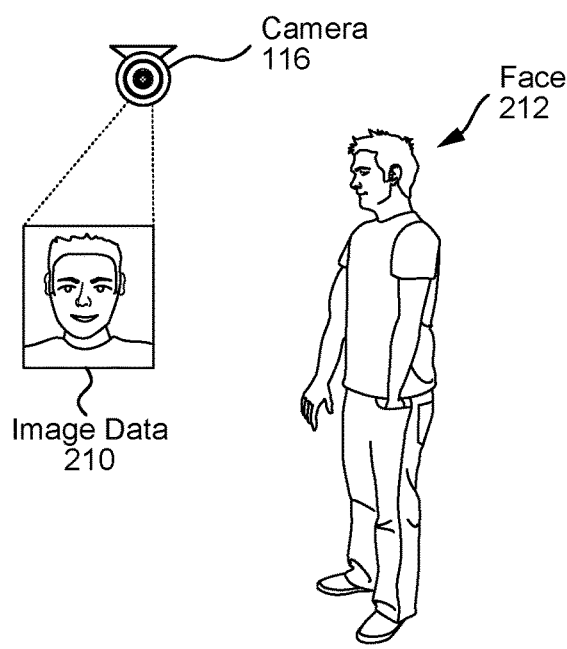
FIG. 2B
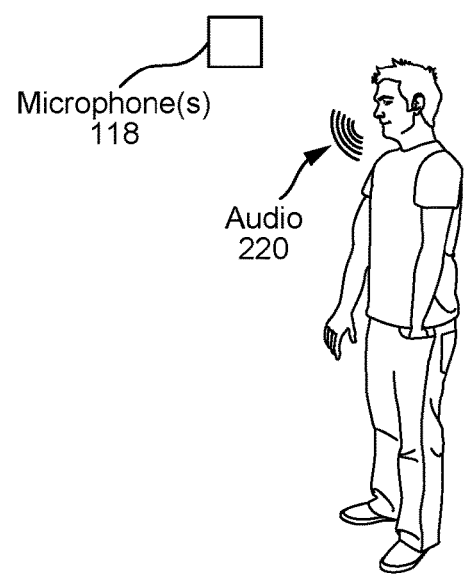
FIG. 2C
FIG. 2D
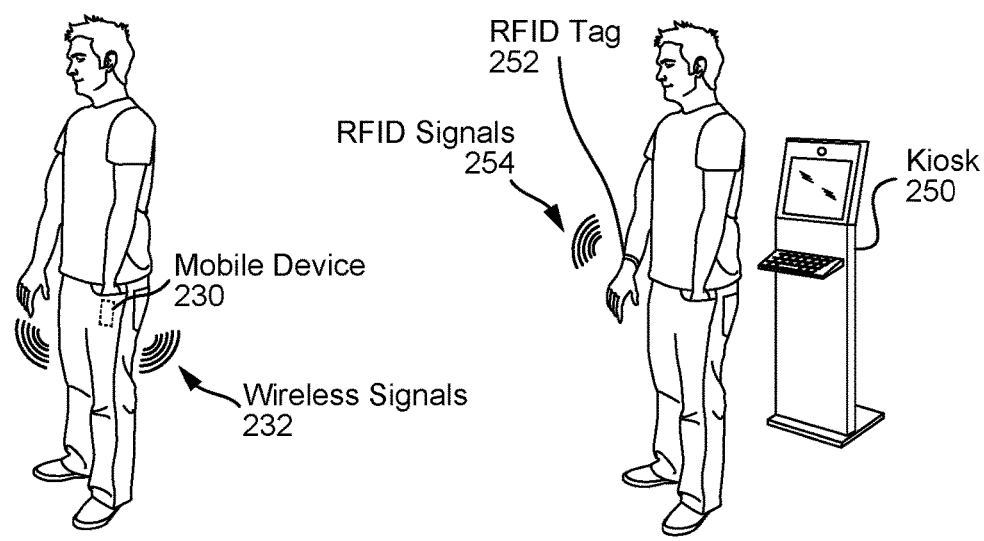

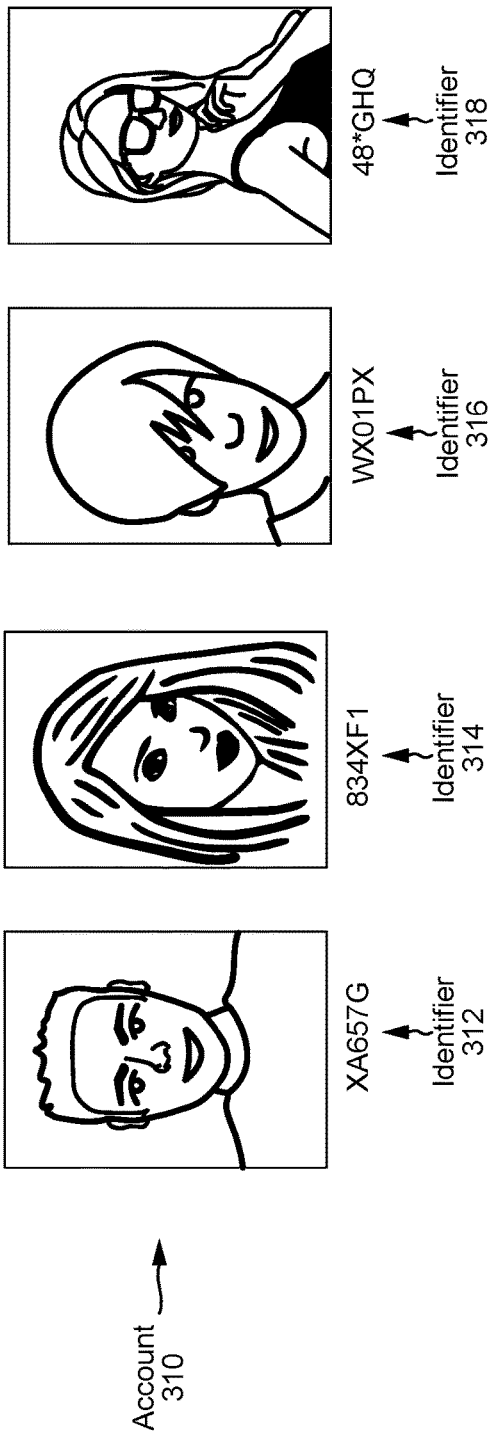
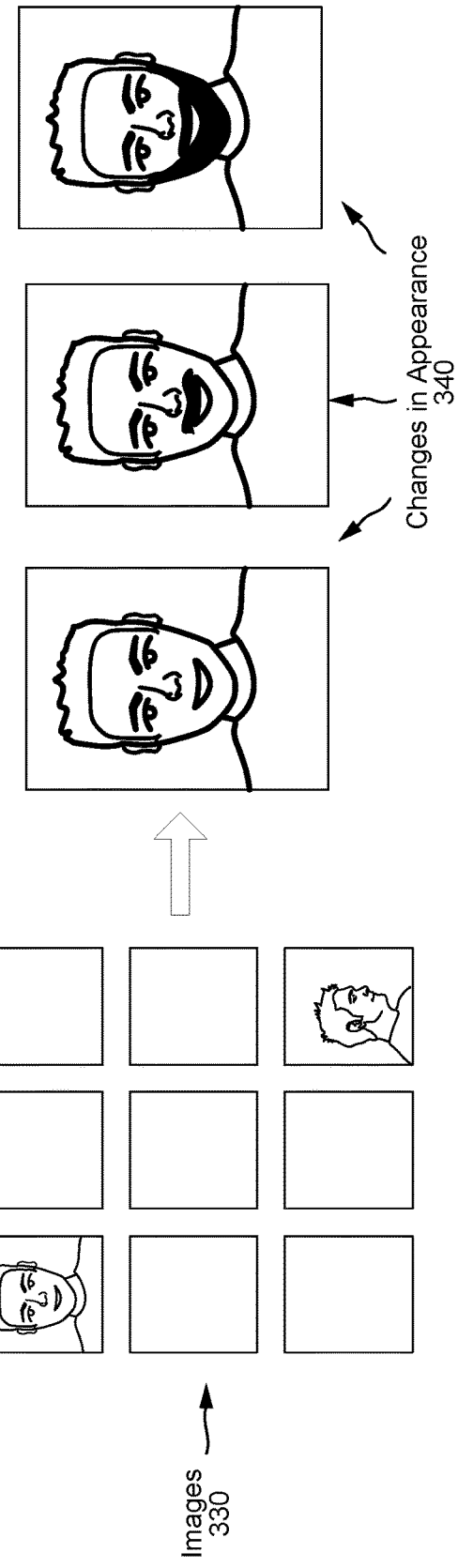

FIG. 4
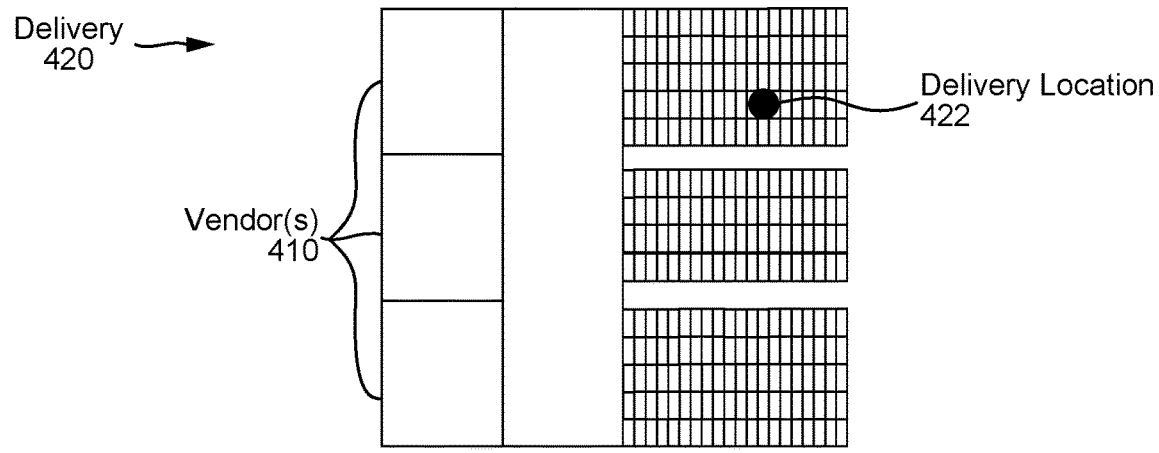
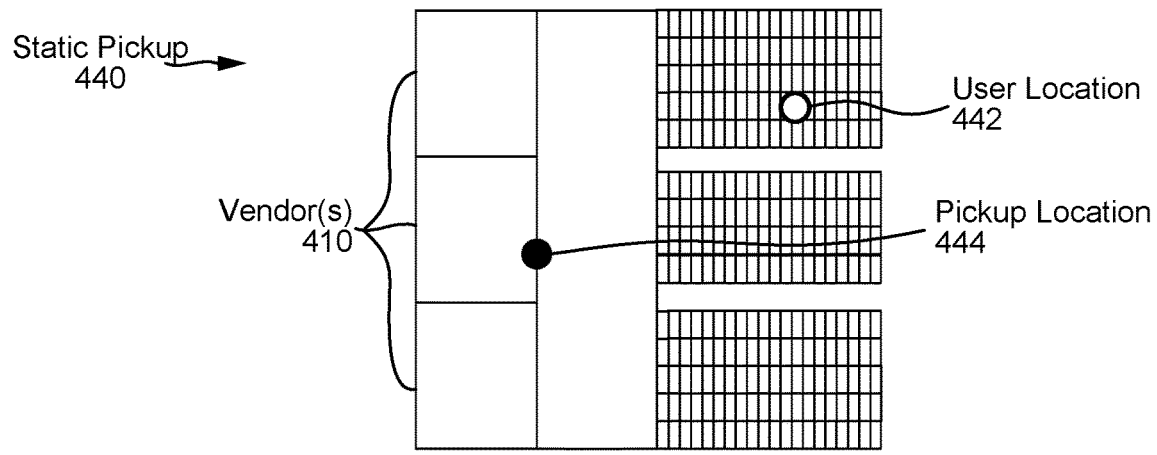
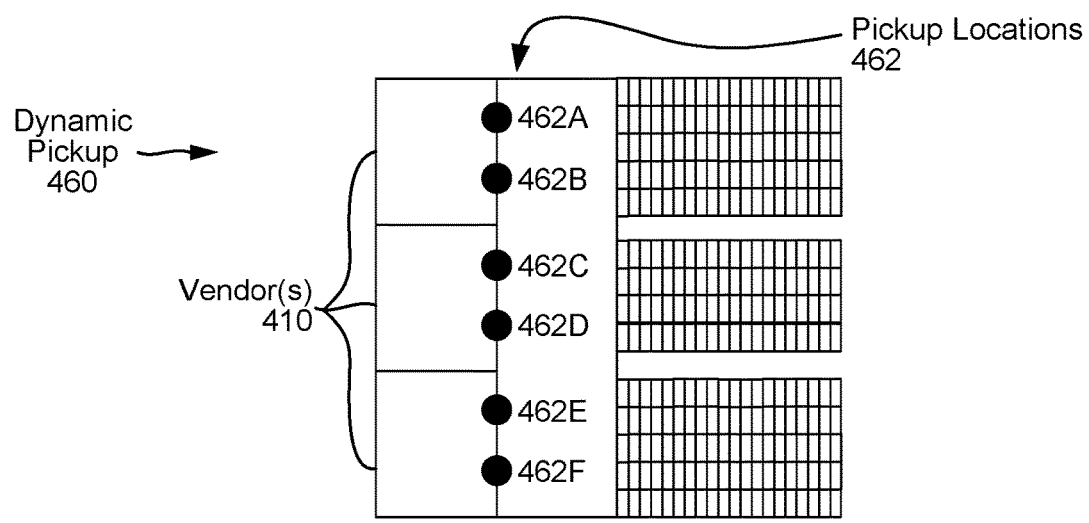

FIG. 5
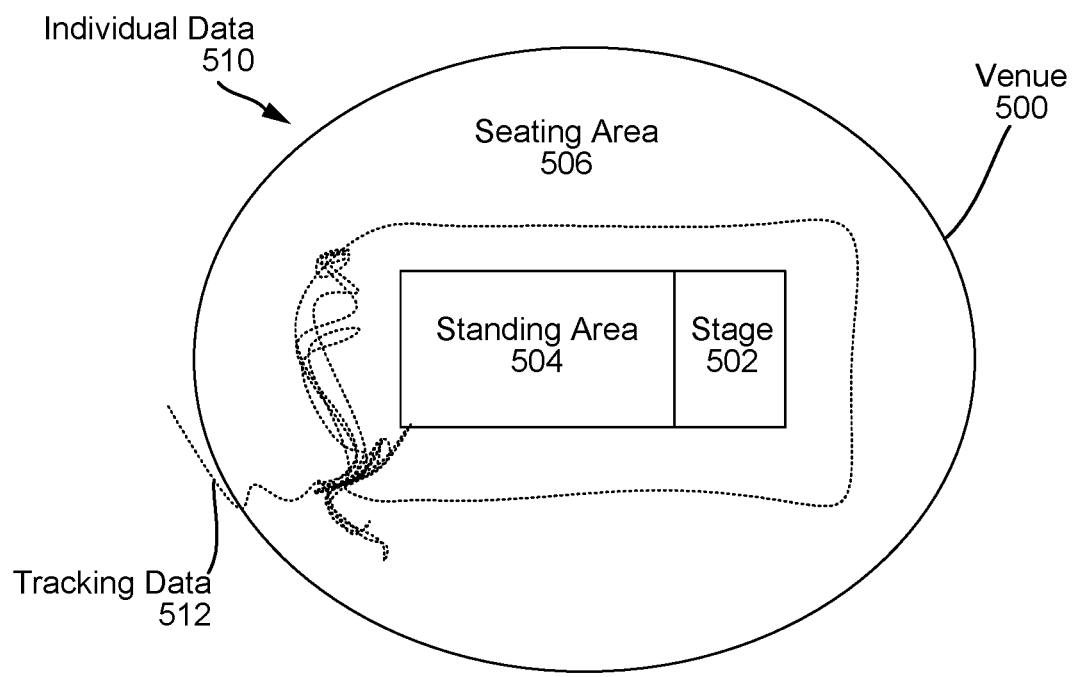
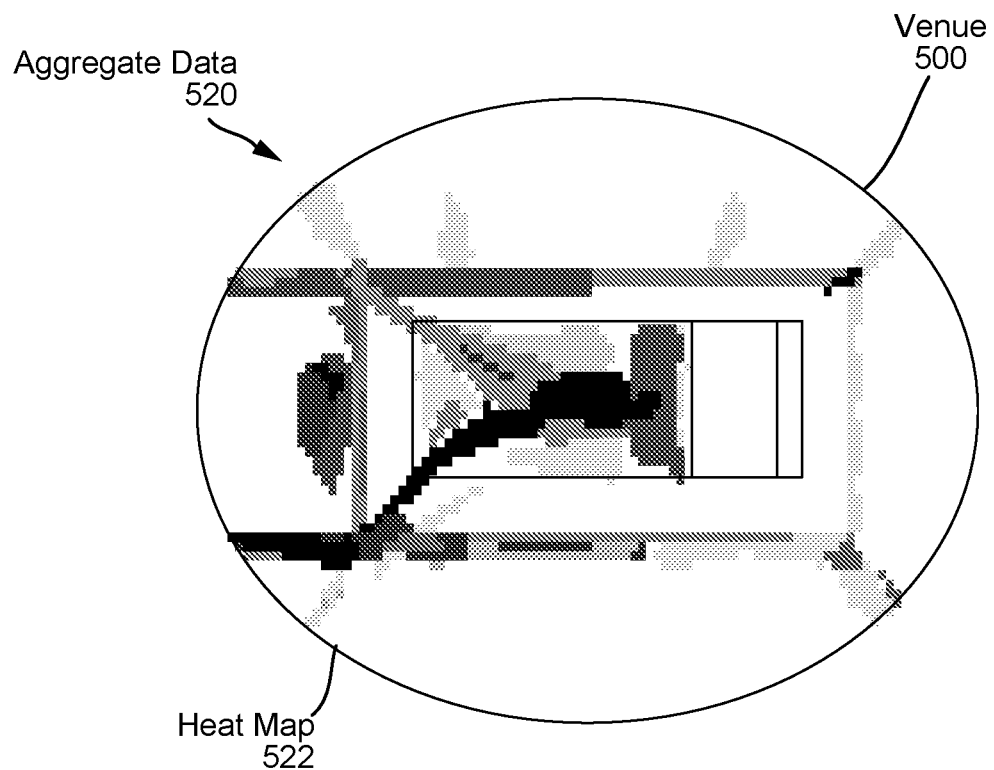

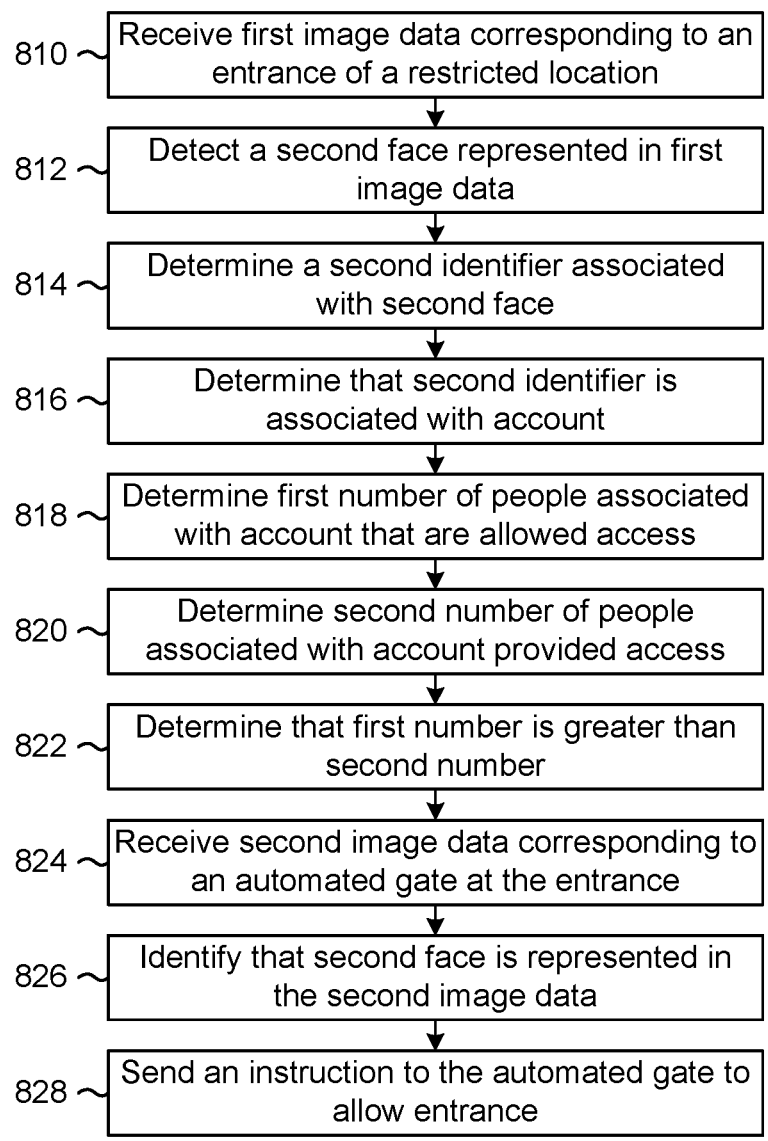

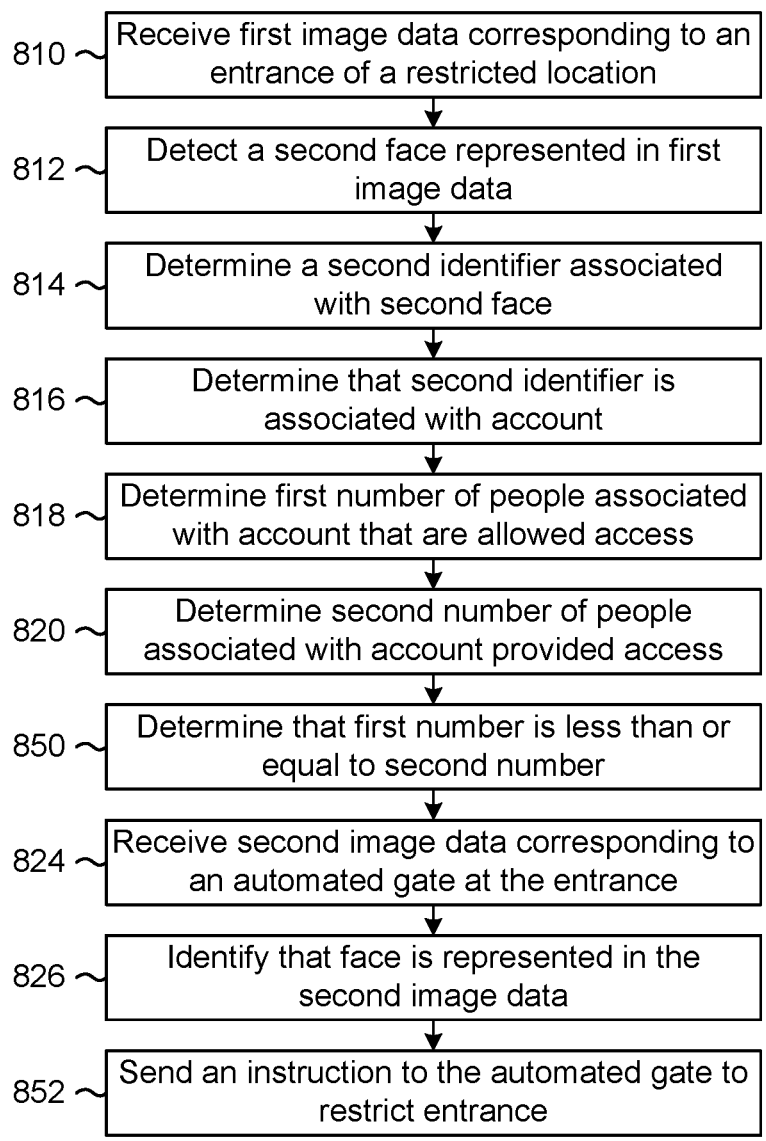

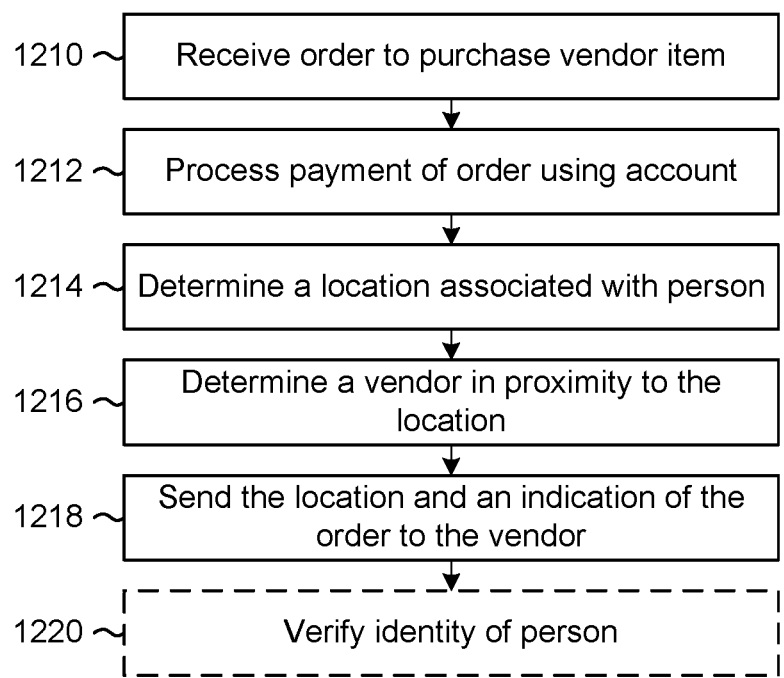

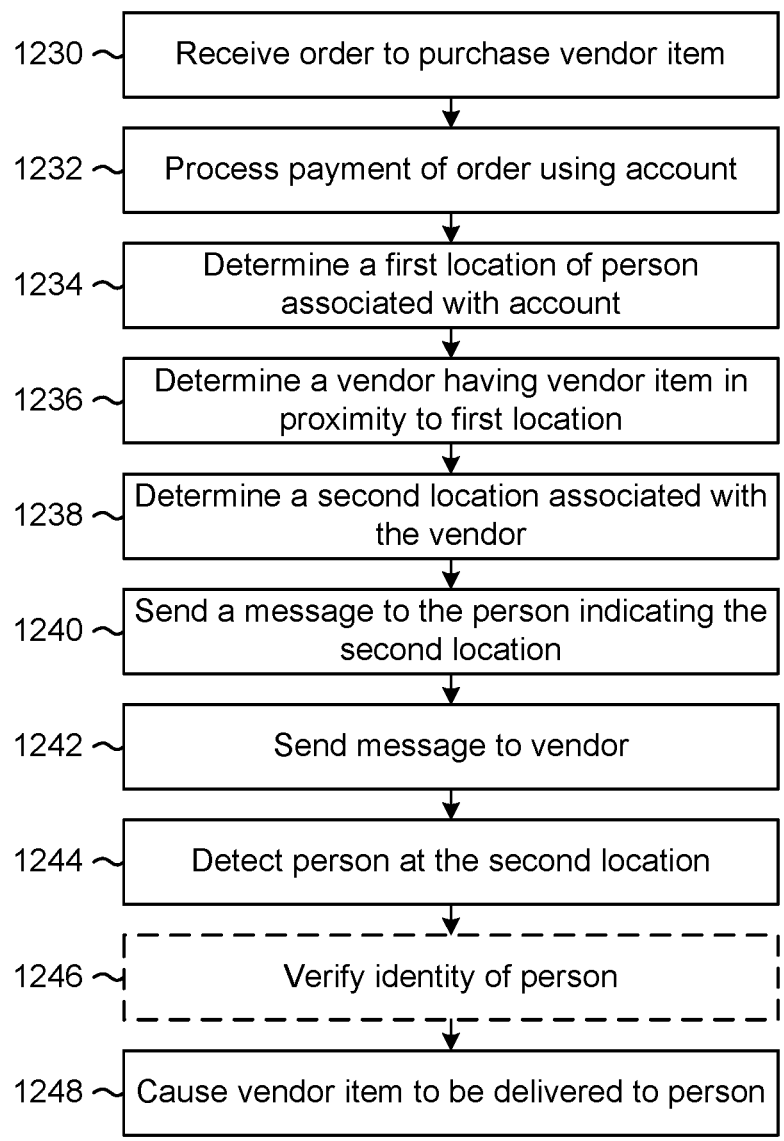

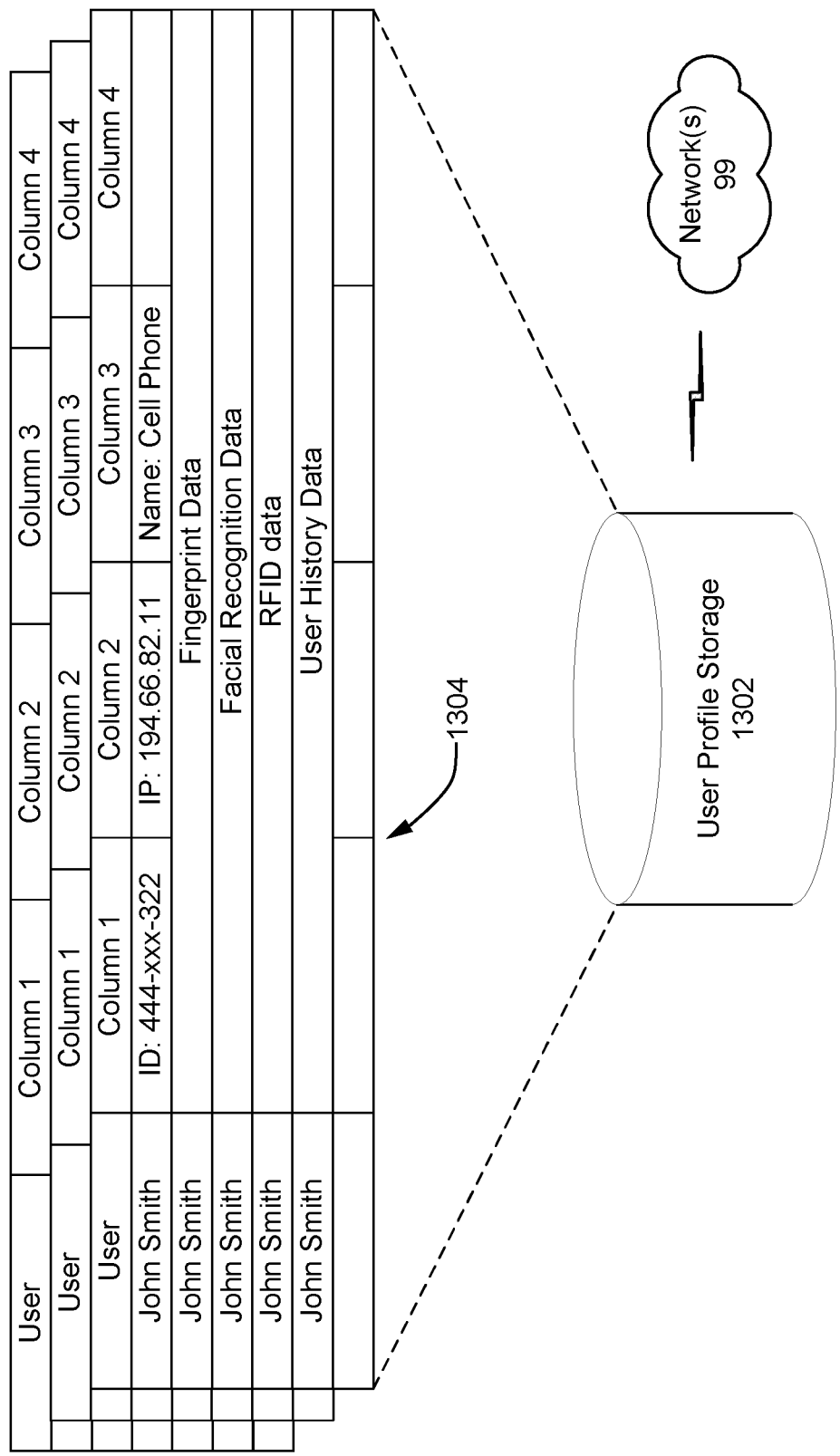

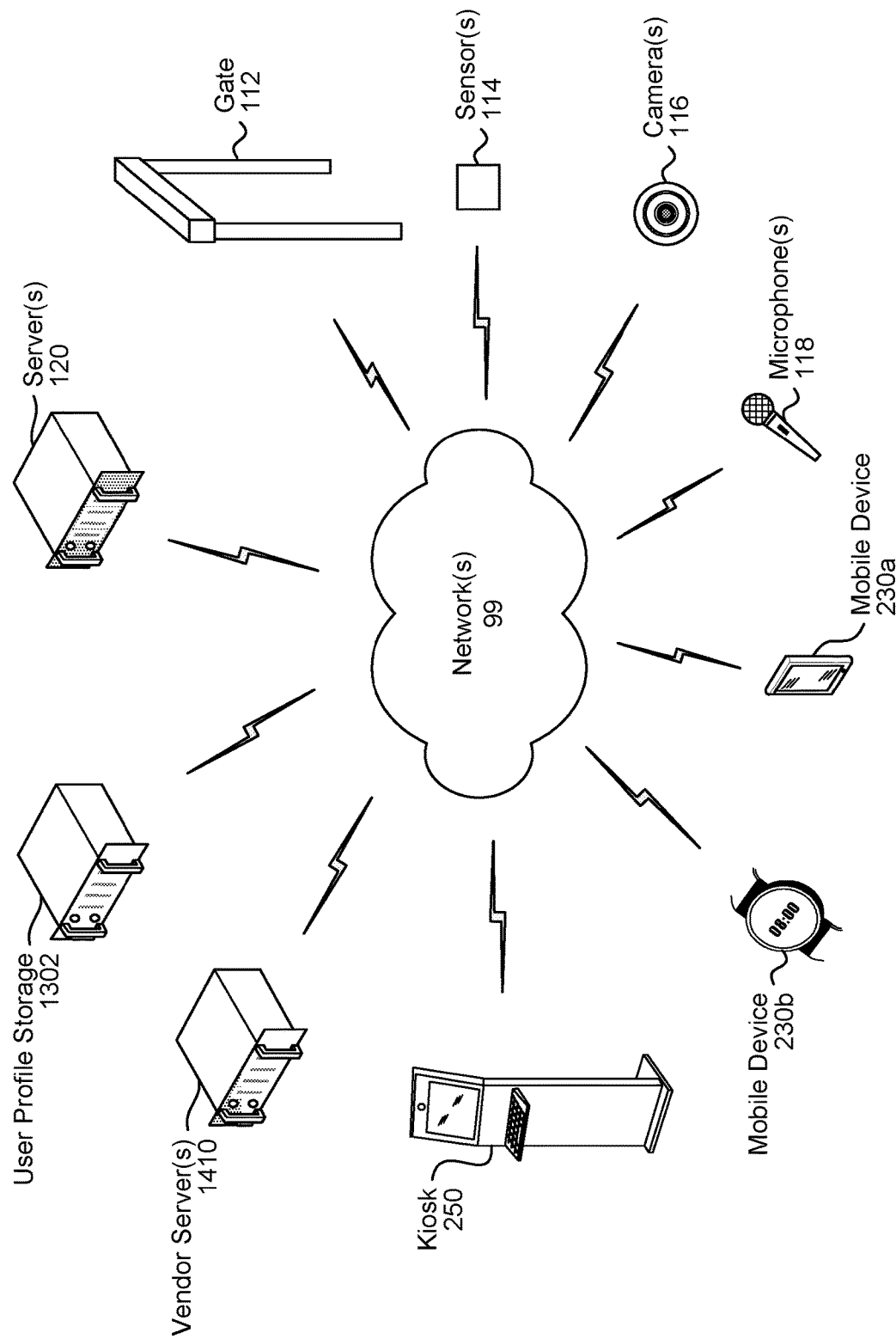

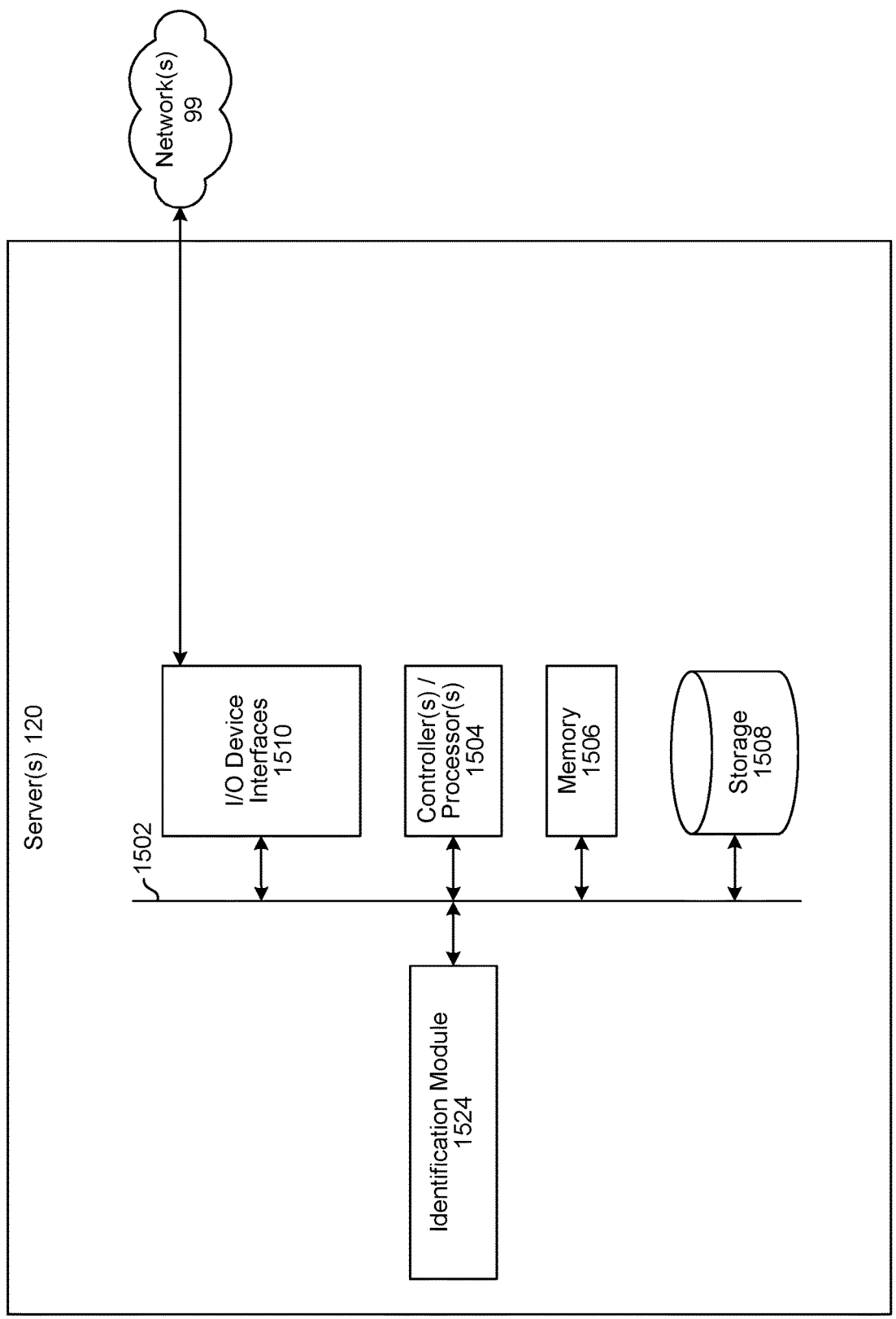

TICKETLESS ENTRY AND TRACKING

BACKGROUND

People may purchase tickets in order to access certain areas or events, such as concerts or sporting events. Typically, tickets need to be displayed in order to gain access to the event. Disclosed herein are technical solutions to improve a user experience when attending the event.

BRIEF DESCRIPTION OF DRAWINGS

For a more complete understanding of the present disclosure, reference is now made to the following description taken in conjunction with the accompanying drawings.

FIG. 1A illustrates a system for controlling user access to a location without a ticket according to an embodiment of the present disclosure.

FIG. 1B illustrates a system for allowing user access to concessions according to an embodiment of the present disclosure.

FIGS. 2A-2D illustrate examples of verifying an account associated with a person and tracking a location of the person in a venue according to embodiments of the present disclosure.

FIGS. 3A-3B illustrate examples of multiple faces associated with an account and updating facial recognition data to track changes in appearance according to embodiments of the present disclosure.

FIG. 4 illustrates examples of delivering vendor items according to embodiments of the present disclosure.

FIG. 5 illustrates examples of tracking data according to embodiments of the present disclosure.

FIGS. 8A-8B are flowcharts conceptually illustrating example methods of determining to allow or deny access to a restricted location according to embodiments of the present disclosure.

FIGS. 12A-12C are flowcharts conceptually illustrating example methods of purchasing and delivering concession items according to embodiments of the present disclosure.

FIG. 13 illustrates data stored and associated with user profiles according to embodiments of the present disclosure.

FIG. 14 illustrates an example of a computer network for use with the system.

FIG. 15 is block diagram conceptually illustrating example components of a system for ticketless entry and tracking according to embodiments of the present disclosure.

DETAILED DESCRIPTION

Figure 6:
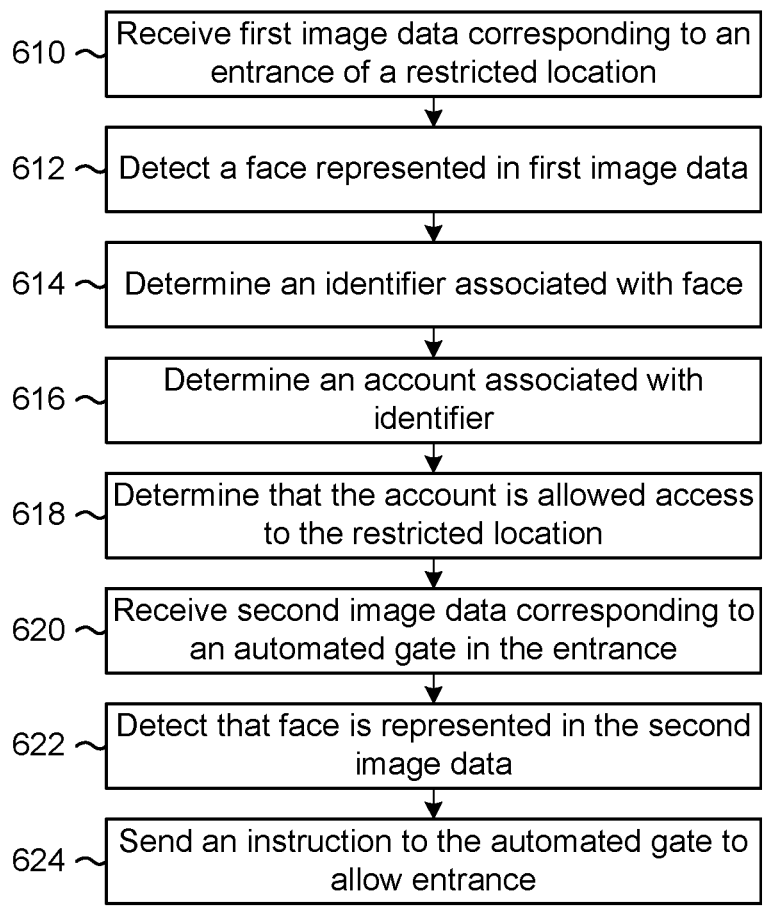
FIG. 6 is a flowchart conceptually illustrating an example method of verifying an identity using facial recognition according to embodiments of the present disclosure.

People may purchase tickets in order to access certain areas or events, such as concerts or sporting events. Typically, some form of ticket needs to be displayed at an entrance to the event in order to gain access to the event. This ticket may be in paper form or may be in electronic form and presented on a device in order for a user to gain access to the event. However, requiring the user to stop at the entrance results in friction at the point of entry, which impedes accessibility and may result in lines, delays, or the like. In addition, physical tickets may be lost or forgotten at home, whereas electronic tickets require a user to display the electronic ticket on a mobile device every time the ticket needs to be identified.

To improve a user experience when attending an event, offered is a ticketless entry system that associates tickets with an account and verifies a user associated with the account using far field verification techniques (e.g., without requiring direct interaction with the user). For example, the system may use facial recognition, voice recognition and/or detect a wireless signal (e.g., collectively, far field verification) to detect the user, determine an identifier associated with the user and/or determine the account associated with the user. As a result, the user may access the event without stopping at the entrance to provide proof of purchase (e.g., a physical or electronic ticket, bar code, etc.), proof of identification (e.g., driver's license, passport, biometric scans, etc.) and/or other information. As a result of the far field verification, the system 100 enables entry lines to move quickly and efficiently without interruptions, delays and/or lines and without needing a physical or electronic ticket or showing other information to security personnel.

Additionally or alternatively, the system may track a location of the user throughout the event and/or verify the account for additional functionality. For example, the system may enable the user to purchase vendor items from a vendor during the event using the far field verification. Thus, the system may reduce a time spent waiting in line to pay for the vendor items. In addition, the system may enable the user to place an order remotely, which may reduce a time spent waiting in line to order the vendor items, and since the vendor items are associated with the account and not a specific vendor, the system may provide the user flexibility to pick up the vendor items from one of many vendors at the event.

FIG. 1A illustrates a high-level conceptual block diagram of a system 100 for controlling user access to a location without a ticket according to embodiments of the present disclosure. As used herein, a restricted area may refer to a venue associated with an event (e.g., concert, ballgame, theater, etc.), a destination (e.g., amusement park, resort, office building, etc.), a transportation hub (e.g., airport, bus terminal, train station, subway, etc.), or the like, where access is restricted to some subgroup of individuals. For ease of explanation, the following drawings and corresponding description may refer to an event that is associated with a venue (e.g., physical location of the event), but the disclosure is not limited thereto.

As illustrated in FIG. 1A, the system 100 may include server(s) 120 communicatively coupled to a gate 112, sensor(s) 114, camera(s) 116, microphone(s) 118 and/or other devices (not shown) via network(s) 99. The gate 112 may be located in an entrance 20 and may include the sensor(s) 114, the camera(s) 116, and/or the microphone(s) 118, and the entrance 20 may include multiple gates 112 along with additional sensor(s) 114, camera(s) 116 and/or microphone(s) 118 separate from the gates 112. Each of the gate 112, the sensor(s) 114, the camera(s) 116 and/or the microphone(s) 118 may include a network adapter to communicate to the network(s) 99, although the disclosure is not limited thereto and the gate 112, the sensor(s) 114, the camera(s) 116 and/or the microphone(s) 118 may be connected to each other and/or another device that includes a network adapter without departing from the disclosure. The server(s) 120 may receive (e.g., from the gate 112, the sensor(s) 114, the camera(s) 116, the microphone(s) 118, and/or the other devices) information corresponding to a user 10 and may determine whether to grant the user 10 access to the restricted area based on an account associated with the user 10.

In order to attend an event (e.g., concert), a system may receive an order to purchase access to the event (e.g., purchase a ticket), where the order is placed using an account associated with the user 10. The system 100 may receive payment corresponding to the order and may store an indication that the account has access to the event.

When the user 10 arrives to attend the event, in some examples the system 100 may determine that the user 10 is in proximity to the venue and/or a location of the user 10 and may send a welcome message to the user 10. For example, the system 100 may send the welcome message to the user 10 via a mobile device associated with the user 10, or may display a message acknowledging the user at some display proximate to an entrance. The system 100 may generate the welcome message to include information relevant to the user 10 based on the event, such as an entrance in proximity to the location of the user 10, a schedule of the event, where to find customer support, kiosks or other assistance, and/or the like.

When the user 10 is in proximity to an entrance (e.g., entrance 20) to the event, the system 100 may detect the user 10 using one or more techniques known to one of skill in the art (e.g., near field communication (NFC) technology and/or radio frequency identification (RFID) technology using sensor(s) 114, facial recognition using camera(s) 116, voice recognition using microphone(s) 118, etc.), may determine the account associated with the user 10, and may determine that the account has access to the event based on the indication. Thus, as the user 10 approaches the entrance, the system 100 has already verified the account and determined that the user 10 may enter the event. Therefore, the system 100 may allow the user 10 to enter the event without requiring a physical or electronic ticket or other proof of purchase. For example, when the user 10 approaches a gate (e.g., gate 112) in the entrance, the system 100 may identify the gate corresponding to the user 10 and send an instruction to the gate to allow the user 10 to enter the event.

The system 100 may also send/display a message to customer support and/or security personnel monitoring the entrance to indicate that the user 10 is allowed to enter the event. For example, the system 100 may send a message to a security booth indicating that the user 10 is allowed to enter the event along with additional information about the user 10. Additionally or alternatively, the system 100 may send a command to a device to cause a visual indication that the user 10 is allowed to enter the event. For example, the system 100 may cause a green light to flash when the user 10 is allowed to enter, although the disclosure is not limited thereto.

Detecting the user 10 and/or verifying an account associated with the user 10 using facial recognition, voice recognition and/or wireless signals may be referred to as far field verification (e.g., verification techniques that don't require direct interaction with the user 10). Using far field verification, the system 100 may verify the user 10 and/or the account without requiring the user 10 to stop at the gate to provide proof of purchase (e.g., a physical or electronic ticket, bar code, etc.), proof of identification (e.g., driver's license, passport, biometric scans, etc.) and/or other information. Requiring the user 10 to stop at the gate results in friction at the point of entry, which impedes accessibility and may result in lines, delays, or the like. Therefore, the system 100 enables entry lines to move quickly and efficiently without interruptions, delays and/or lines and without needing a physical or electronic ticket or showing other information to security personnel.

As illustrated in FIG. 1A, the system 100 may receive (130) image data corresponding to an entrance of a restricted location. For example, the image data may be captured by the camera(s) 116 included in a gate 112 in the entrance 20 to the event. The system 100 may detect (132) a face in the image data, determine (134) an identity associated with the face and determine (136) an account associated with the identity. For example, the system 100 may detect a face of the user 10, determine an identity (e.g., "John Smith") associated with the face and determine the account with which John Smith purchased access to the event. While FIG. 1A illustrates the system 100 determining an identity associated with the user 10, the disclosure is not limited thereto and in some examples the system 100 may determine the account associated with the user 10 without determining the identity of the user 10, or using a different technique.

The system 100 may determine (138) that the account is allowed access to the restricted location and may cause (140) access to the restricted location to be granted to the user 10. For example, the system 100 may determine that the account purchased access to the event (e.g., purchased tickets) and may send an instruction to the gate 112 to allow the user 10 to enter the event.

While not shown in FIG. 1A, the system 100 may be unable to determine the account associated with the user 10 and/or may be unable to verify that the user 10 is associated with the account using far field verification. When this happens, the gate 112 may deny access to the user 10 and customer support personnel may provide additional assistance. For example, the user 10 may provide proof of purchase, proof of identification, use a biometric scanner, enter account information or the like to identify the account and/or verify that the user 10 is associated with the account. When the account has purchased access to the event, customer support personnel may determine the account associated with the user 10 and may provide an alternate means of verification to the user 10 (e.g., issue RFID tags to the user 10 or the like). The system 100 may allow access to the user 10 and/or track a location of the user 10 using the alternate means of verification.

While FIG. 1A illustrates an example of verifying the account using far field verification, the disclosure is not limited thereto. Instead, the system 100 may allow access to the event to the user 10 based on near-field verification techniques associated with the account. For example, the system 100 may verify the account and/or that the user 10 is associated with the account based on identification (e.g., driver's license, passport, credit card or the like), using a biometric scanner (e.g., fingerprint scanner, retina scanner, etc.), account information (e.g., user identification and password, barcode associated with the account, etc.), or the like. Thus, access to the event is linked to the account instead of to proof of purchase (e.g., ticket) and the system 100 may allow the user 10 access to the event by verifying the account. For example, instead of scanning a physical or electronic ticket that admits the user 10 to an individual event, the system 100 may scan a barcode (e.g., printed or electronic) associated with the account that enables the user 10 to access multiple events.

While not shown in FIG. 1A, the system 100 may determine that the user 10 is not allowed access to the restricted location. When this happens, the gate 112 may deny access to the user 10 and customer support personnel may provide additional assistance. In some examples, the customer support personnel may determine that the account associated with the user 10 did not purchase access to the restricted location and may enable the user 10 to purchase access to the restricted location, if additional access is available. However, if the event is sold out and/or the user 10 declines to purchase access to the event, the customer support personnel may request that the user 10 move away from the entrance 20.

The system 100 may determine that the user 10 is associated with the account when the system 100 determines that a confidence score exceeds a verification threshold. The confidence score may indicate a likelihood that the user 10 is associated with the account, and the system 100 may determine the confidence score using one or more of the verification techniques discussed above. In some examples, the system 100 may determine that the confidence score exceeds the verification threshold based on a single verification technique (e.g., facial recognition, voice recognition, NFC signals, RFID signals, etc.). However, the disclosure is not limited thereto and the system 100 may determine that the confidence score is below the verification threshold based on a single identification technique. For example, the system 100 may associate voice recognition, NFC signals and/or RFID signals with a low confidence score, and/or may determine a low confidence score due to facial recognition not matching above a recognition threshold (e.g., due to poor lighting, changes in appearance, multiple matches, etc.). Therefore, the system 100 may require two or more verification techniques in order to determine that the confidence score exceeds the verification threshold without departing from the disclosure. For example, the system 100 may determine a low confidence score due to facial recognition not matching above the threshold but may increase the confidence score above the verification threshold based on voice recognition and/or detecting corresponding NFC/RFID signals.

In some examples, the system 100 may determine that additional security is required and may increase the verification threshold. For example, the system 100 may increase the verification threshold for certain events (e.g., Championship games, World Series, etc.), for private events (e.g., events closed to the public), for expensive events (e.g., when purchasing access to the event exceeds a threshold), when alcohol is served at the event (e.g., a minimum age is required), or the like, Depending on the additional security required, the system 100 may require two or more verification techniques without departing from the disclosure, even when a confidence score associated with a first verification technique exceeds the verification threshold.

After allowing the user 10 to access the restricted location, the system 100 may track a location of the user 10 and/or verify the account associated with the user 10 to provide additional functionality, such as allowing the user 10 to purchase vendor items from vendors within the restricted location using the account.

FIG. 1B illustrates a high-level conceptual block diagram of a system 100 configured to track a location of a person within a restricted area and/or verify an account associated with the person according to embodiments of the present disclosure. As illustrated in FIG. 1B, the system 100 may include server(s) 120 communicatively coupled to sensor(s) 114, camera(s) 116, microphone(s) 118, a vendor 30 and/or other devices (not shown) via network(s) 99. The sensor(s) 114, the camera(s) 116 and/or the microphone(s) 118 may be located throughout the venue. Each of the sensor(s) 114, the camera(s) 116 and/or the microphone(s) 118 may include a network adapter to communicate to the network(s) 99, although the disclosure is not limited thereto and the sensor(s) 114, the camera(s) 116 and/or the microphone(s) 118 may be connected to each other and/or another device that includes a network adapter without departing from the disclosure. The server(s) 120 may receive (e.g., from the sensor(s) 114, the camera(s) 116, the microphone(s) 118, and/or the other devices) information corresponding to a user 10 and may track a location of the user 10 within the venue, verify an account associated with the user 10, and/or perform additional functionality. The venue may include one or more vendors (e.g., vendor 30) that offer something for sale to the user 10. For example, the vendor 30 may correspond to a concession stand selling concession items (e.g., food, drink and/or other refreshments), a gift shop selling apparel, memorabilia and/or other keepsakes associated with the event and/or venue, or the like.

To track the location of the user 10, the system 100 may detect the user 10 using one or more techniques known to one of skill in the art (e.g., near field communication (NFC) technology and/or radio frequency identification (RFID) technology using sensor(s) 114, facial recognition using camera(s) 116, voice recognition using microphone(s) 118, etc.) and may determine a location associated with the user 10. The system 100 may track the location of the user 10 over a period of time (e.g., during the event) and may store the location information for various functionality.

While FIG. 1B illustrates an example of tracking the location of the user 10 using far field verification (e.g., facial recognition, voice recognition, NFC signals, RFID signals, etc.), the disclosure is not limited thereto. Instead, the user 10 may provide proof of access (e.g., physical ticket, electronic ticket, barcode associated with the account, etc.) at various checkpoints and the system 100 may track the user 10 based on the checkpoints. Using the proof of access (e.g., ticket), the system 100 may identify the account that purchased access to the event (e.g., account that purchased the ticket) and may associate tracking data with the account without the user 10 providing additional information to verify the account. However, the disclosure is not limited thereto and the system 100 may not associate the tracking data with an account without departing from the disclosure.

As illustrated in FIG. 1B, the system 100 may receive (150) first image data corresponding to a first location at a first time. For example, the first image data may correspond to a camera 116 in proximity to the vendor 30. The system 100 may detect (152) a face in the first image data, determine (154) an identity of a person associated with the face and may determine (156) an account associated with the identity. For example, the system 100 may detect a face of the user 10, determine an identity (e.g., "John Smith") associated with the face and determine the account associated with John Smith. While FIG. 1B illustrates the system 100 determining the identity associated with the user 10, the disclosure is not limited thereto and in some examples the system 100 may determine the account associated with the user 10 without determining the identity of the user 10, or using other techniques.

The system 100 may associate (158) the first location and the first time with the identity and/or the account and track (160) the person within the venue. For example, the system 100 may detect the person periodically during the event and may store location information indicating the location and a corresponding time.

The system 100 may enable (162) purchases via the account within the venue. For example, the user 10 may verify an account associated with the user 10 in order to enhance a user experience when purchasing vendor items from the vendors. In some examples, the system 100 may enable the user 10 to purchase a vendor item (e.g., drink, food, apparel, etc.) using the account without requiring a payment process (e.g., providing cash, credit cards and/or debit cards to the vendor in order to make a purchase). Instead, the user 10 may indicate the vendor items to purchase and the system 100 may generate an order including the items and process the order using the account (e.g., receive payment using payment methods associated with the account).

Additionally or alternatively, the system 100 may enable the user 10 to purchase a vendor item (e.g., drink, food, apparel, etc.) using the account without requiring a checkout process (e.g., cashier to ring up items and charge the items to the account). Instead, the user 10 may place an order at the vendor and/or remotely (e.g., using a kiosk, mobile device or the like) and the system 100 may process the order using the account and deliver the vendor item to the user 10, as will be discussed in greater detail below with regard to FIG. 4. For example, the system 100 may (a) determine a first location of the user 10 and deliver the vendor item to the user 10 at the first location, (b) determine a second location of the vendor item, send the second location to the user 10 and deliver the vendor item to the user 10 at the second location, (c) determine that the user 10 is at a vendor and deliver the vendor item to the user 10 at the vendor, and/or deliver the vendor item using other techniques known to one of skill in the art.

As the system 100 enables the user 10 to place an order remotely (e.g., using the kiosk or the mobile device), the system 100 may reduce a time spent waiting in line to order the vendor item. In addition, the system 100 may indicate to the user 10 (e.g., using the kiosk, the mobile device or a display in proximity to the vendor) a status of the order or the next several orders (e.g., ready for pickup or being prepared), which may reduce an amount of time spent waiting for the vendor item to be ready for delivery to the user 10. Additionally or alternatively, in some examples the system 100 may enable the user 10 to pick up the vendor item from multiple vendors instead of a specific vendor. For example, the user 10 may order a concession item (e.g., hot dog) while near a first vendor but may pick up the concession item at a second vendor. Thus, the order payment is processed through the account but the order is not tied to a specific vendor, enabling the user 10 flexibility in where to pick up the vendor item.

The system 100 may enable the user 10 to set a limit on spending during the event for the user 10 and/or individual users associated with the account. For example, the user 10 may control the account and may not have a personal spending limit, but the user 10 may set a spending limit for a second user (e.g., child) associated with the account, allowing the second user to purchase inexpensive vendor items without requiring the user 10. The system 100 may enable the user 10 to check current spending and/or update spending limits during the event, such as by using a kiosk or the mobile device.

In some examples, the system 100 may enable the user 10 to purchase a vendor item to be delivered to a residence of the user 10. For example, the user 10 may select a vendor item available at the vendor (e.g., apparel or other memorabilia) but may not want to carry the vendor item during the event. The system 100 may enable the user 10 to place an order for the vendor item and the system 100 may verify the account associated with the user 100 as discussed above, but may arrange for the vendor item to be delivered to the residence of the user 10.

In some examples, the system 100 may verify the identity of the user 10 and/or that the user 10 is associated with the account before delivering the vendor items to the user 10. For example, the system 100 may determine a confidence score that the user 10 is associated with the account and may deliver the vendor items to the user 10 only if the confidence score exceeds a verification threshold. In some examples, the system 100 may determine that additional security is required and may increase the verification threshold and/or verify the account using two or more forms of verification (e.g., using facial recognition, voice recognition, NFC technology, RFID technology, biometric scans, account information, identification information or the like). For example, the system 100 may require additional security for certain vendor items (e.g., alcohol) or for orders having a price that exceeds a threshold (e.g., orders that cost more than $50). The system 100 may enable the user 10 to set the verification threshold and may associate different verification thresholds with different users associated with the account (e.g., lower threshold for the user 10, but a higher threshold for the second user).

As an example of verifying the identity of the user 10 and/or that the user 10 is associated with the account, the system 100 may use facial recognition to determine a confidence score indicating a likelihood that the user 10 is associated with the account. In some examples, such as when the confidence score exceeds the verification threshold, the system 100 may deliver the vendor items to the user 10 without requiring an additional form of verification (e.g., using voice recognition, NFC technology, RFID technology, biometric scans, account information, identification information or the like). However, when the confidence score is below the verification threshold, the system 100 may automatically verify the account (e.g., using voice recognition, NFC technology and/or RFID technology) or may request that the user 10 verify the account (e.g., request a biometric scan, account information, identification information or the like from the user 10). However, the disclosure is not limited thereto and in some examples the system 100 may require two or more forms of verification regardless of whether the confidence score exceeds the verification threshold. For example, the system 100 may request a biometric scan and/or identification information before serving alcohol to the user 10.

In some examples, the system 100 may associate the location information with the user 10 and/or the account associated with the user 10. For example, the system 100 may generate user history indicating the locations that the user 10 visited within the venue (and/or account history indicating the locations that multiple users associated with the account visited within the venue). Thus, the system 100 may identify an exact location of the user 10 at a specific time, may determine frequent locations or a preferred area within the venue, may determine vendors that the user 10 visited or the like. Using the location information, in some examples the system 100 may identify the user 10 in image data captured at the event (e.g., images taken by professional event photographers, within a photo booth at the venue, or the like) and may upload the image data to the account automatically. Additionally or alternatively, the system 100 may generate a personalized highlight video of the event taking into account the location information. For example, the personalized highlight video may include and/or emphasize the locations that the user 10 visited. Additionally or alternatively, the personalized highlight video may be generated based on a vantage point associated with the location(s). For example, the system 100 may capture image data of the event (e.g., concert) from multiple camera(s) 116 within the venue, may determine a location from which the user 10 viewed the event (e.g., seats at the concert) and may generate the personalized highlight video to capture the concert from the perspective of the user 10.

In some examples, the system 100 may track the location information over a longer period of time, such that the user history may include location information corresponding to multiple events. The system 100 may use the user history to generate recommendations to the user 10 or send promotional information. For example, the system 100 may determine that the user 10 frequently visits a particular vendor and may send advertisements and/or discounts associated with the vendor to the user 10.

Additionally or alternatively, the system 100 may associate purchases made by the user 10 with the user history (and/or purchases made by multiple users associated with the account with the account history) and may use the user history to predict a path of the user 10 in future events and/or to estimate a predicted demand of the user 10. For example, the system 100 may detect that the user 10 is walking in a first direction and may predict that the user 10 is walking to a particular location and/or vendor (e.g., vendor 30). In some examples, the system 100 may estimate the predicted demand of the user 10 and send the predicted demand to the vendor 30 to assist the vendor 30 in anticipating a purchase of the user 10. For example, the vendor 30 may increase supply in response to the predicted demand (e.g., cook additional food) and/or request supply from another vendor within the venue. Thus, the system 100 may enable the vendors to dynamically allocate supply within the venue to meet a demand.

In some examples, the system 100 may store aggregate data for multiple users to generate information about traffic patterns or other data associated with the venue, as discussed in greater detail below with regard to FIG. 5. For example, the system 100 may generate a heat map indicating bottlenecks and choke points within the venue, areas of the venue that were associated with high foot traffic or the like. Additionally or alternatively, the system 100 may determine a predicted demand for multiple users and may determine an aggregate predicted demand for the venue as a whole or for individual vendors within the venue. Thus, the vendors may use the aggregate predicted demand to determine an amount of items to stock and/or to set prices or generate promotions for future events.

Although FIGS. 1A-1B, and other figures/discussion illustrate the operation of the system in a particular order, the steps described may be performed in a different order (as well as certain steps removed or added) without departing from the intent of the disclosure. In addition, while the examples described herein illustrate the server(s) 120 performing multiple functions, the disclosure is not limited thereto. Instead, the gate 112, the sensor(s) 114, the camera(s) 116, the microphone(s) 118, and/or the other devices may perform any of the functions described herein without departing from the disclosure. A single server 120 may be capable of performing all of the functions or multiple server(s) 120 may combine to perform the functions.

FIGS. 2A-2D illustrate examples of verifying an account associated with a person and tracking a location of the person in a venue according to embodiments of the present disclosure. As discussed above, the system 100 may detect the user 10 and verify the account using one or more techniques known to one of skill in the art, such as facial recognition using camera(s) 116, voice recognition using microphone(s) 118, near field communication (NFC) technology and/or radio frequency identification (RFID) technology using sensor(s) 114, or the like.

FIG. 2A illustrates a first example in which the system 100 may capture image data 210 using one or more camera(s) 116, may perform facial recognition on the image data to identify a face 212 associated with the user 10 and may determine the account associated with the user 10. In some examples, the system 100 may determine an identity of the user 10, although the disclosure is not limited thereto and the system 100 may verify the account without associating the face 212 with the identity of the user 10. Using the facial recognition, the system 100 may verify the account associated with the user 10 and/or track a location of the user 10 within the venue during the event.

FIG. 2B illustrates a second example in which the system 100 may capture audio data corresponding to audio 220 using one or more microphone(s) 118 and may perform voice recognition on the audio data to identify the user 10 and/or to determine the account associated with the user 10 based on the user's voice represented in the audio data. In some examples the system 100 may determine an identity of the user 10, but the disclosure is not limited thereto and the system 100 may verify the account without associating the audio data with the identity of the user 10. Using the voice recognition, the system 100 may verify the account associated with the user 10 and/or track a location of the user 10 within the venue during the event.

FIG. 2C illustrates a third example in which the system 100 may detect wireless signals 232 (e.g., Near Field Communication (NFC) signals) from a mobile device 230 (e.g., smartphone, smart watch, etc.) associated with the user 10 and may verify the account associated with the user 10 based on the wireless signals 232. In some examples, the system 100 may determine an identity of the user 10, although the disclosure is not limited thereto and the system 100 may verify the account without associating the wireless signals 232 with the identity of the user 10. The system 100 may detect the wireless signals 232 without requiring the user 10 to display the mobile device 230 and/or remove the mobile device 230 from a pocket, purse or the like. Using the wireless signals 232, the system 100 may verify the account associated with the user 10 and/or track a location of the user 10 within the venue during the event.

In some examples, the system 100 may not be able to identify the user 10 and/or verify the account associated with the user 10 using the far field verification. For example, the system 100 may determine that a confidence score associated with the face 212 is below a threshold, the user 10 may not have a mobile device 230 or may prefer not to use the mobile device 230 (e.g., due to low battery level or the like), the mobile device 230 may not support NFC signals, and/or the user 10 may request a redundant form of verification. In some examples, the system 100 may send the mobile device 230 associated with the user 10 a scannable code that can be scanned to verify that the user 10 is allowed access to the event. For example, the mobile device 230 may operate an application that displays the scannable code that is associated with the account, which changes frequently (e.g., every few minutes) to prevent the code being copied or reused. While the scannable code allows the user 10 to enter the event, the scannable code requires the user 10 to stop at any entrance, checkpoint or vendor transaction so that the scannable code can be scanned to verify the account.

FIG. 2D illustrates a fourth example in which the system 100 may include a self-service kiosk 250 that enable the user 10 to identify the user 10 and/or verify the account in order to receive an RFID tag 252 (e.g., RFID bracelet or the like) associated with the account. Additionally or alternatively, the system 100 may include mobile kiosks (not shown) carried by customer support personnel to provide assistance. The RFID tag 252 may generate RFID signals 254 and the system 100 may detect the RFID signals 254 to verify the account, similar to the wireless signals 232 described above. In some examples, the system 100 may determine an identity of the user 10 using the RFID signals 254, although the disclosure is not limited thereto and the system 100 may verify the account without associating the RFID signals 254 with the identity of the user 10. Using the RFID signals 254, the system 100 may verify the account associated with the user 10 and/or track a location of the user 10 within the venue during the event. Thus, the user 10 may stop by the self-service kiosk 250 (or receive assistance from customer support personnel present at the event with mobile kiosks) once to verify the account manually before enjoying the benefits associated with far field verification for the remainder of the event.

Using the kiosk 250, the user 10 may identify and verify the account using one or more techniques, including the techniques discussed above (e.g., facial recognition, voice recognition, or using NFC signals). Additionally or alternatively, the user 10 may identify and verify the account by providing identification (e.g., driver's license, passport, credit card or the like), using a biometric scanner (e.g., fingerprint scanner, retina scanner, etc.), entering account information (e.g., user identification and password, barcode associated with the account, etc.), or the like. In some examples, the user 10 may verify the account using a barcode or other symbol that the kiosk 250 may scan. For example, the user 10 may have a printed barcode associated with the account and/or may use the mobile device 230 to obtain an electronic barcode associated with the account that the kiosk 250 may electronically scan to identify the account. When the account is identified and verified, the system 100 may generate the RFID tag 252 associated with the account to use for the remainder of the event.

The system 100 may determine that the account is verified when the system 100 determines that a confidence score exceeds a verification threshold. The confidence score may indicate a likelihood that the user 10 is associated with the account, and the system 100 may determine the confidence score using one or more of the verification techniques discussed above. In some examples, the system 100 may determine that the confidence score exceeds the verification threshold based on a single verification technique (e.g., facial recognition, voice recognition, NFC signals, providing identification, using the biometric scanner, entering account information, etc.). However, the disclosure is not limited thereto and the system 100 may determine that the confidence score is below the verification threshold based on a single identification technique. For example, the system 100 may determine a low confidence score due to facial recognition not matching above a recognition threshold (e.g., due to poor lighting, changes in appearance, multiple matches, etc.), inadequate or outdated identification, poor matches or errors using the biometric scanners, and/or certain types of verification techniques being poor indicators of identity (e.g., voice recognition, entering account information, etc.).

Therefore, the system 100 may require two or more verification techniques in order to determine that the confidence score exceeds the verification threshold without departing from the disclosure. Thus, the system 100 may determine a low confidence score using a first verification technique but may increase the confidence score above the verification threshold using a second verification technique. For example, the system 100 may determine a low confidence score due to facial recognition not matching above the threshold but may increase the confidence score above the verification threshold based on the voice recognition, the identification, entering the account information, or the like.

In some examples, the system 100 may determine that additional security is required and may increase the verification threshold. For example, the system 100 may increase the verification threshold for certain events (e.g., Championship games, World Series, etc.), for private events (e.g., events closed to the public), for expensive events (e.g., when purchasing access to the event exceeds a threshold), when alcohol is served at the event (e.g., a minimum age is required), or the like, Depending on the additional security required, the system 100 may require two or more verification techniques without departing from the disclosure, even when a confidence score associated with a first verification technique exceeds the verification threshold.

While the above drawings and corresponding description illustrate examples of the system 100 identifying and verifying an account associated with the user 10, the disclosure is not limited thereto. Instead, in some examples the user 10 may provide proof of access to the event (e.g., physical ticket, electronic ticket, physical barcode, electronic barcode, etc.) and the system 100 may generate the RFID tag 252 enabling the user 10 to enter the event using far field verification (e.g., the user 10 doesn't need to provide proof of access at the entrance) and/or enabling the system 100 to track the user 10 during the event. Using the proof of access (e.g., ticket), the system 100 may identify the account that purchased access to the event (e.g., account that purchased the ticket) and may associate the RFID tag 252 with the account without the user 10 providing additional information to verify the account. However, the disclosure is not limited thereto and the system 100 may not associate the RFID tag 252 with an account without departing from the disclosure.

In some examples, the system 100 may generate RFID tags for family, friends or other guests of the user 10 that do not have mobile devices and/or are not associated with the account. For example, the user 10 (e.g., father) may have purchased access to the event for several people, including a second user associated with the account (e.g., wife), a third user associated with the account (e.g., child), and one or more users not associated with the account (e.g., friends of the child). As the access is linked to the account associated with the user 10, the user 10, the second user and/or the third user may be verified using facial recognition and/or NFC signals. However, as the one or more users are not associated with the account, the system 100 may not verify the one or more users using facial recognition or NFC signals and therefore may not allow them access to the event.

To enable far field verification for the one or more users, the user 10 may request individual RFID tags for the one or more users. Additionally or alternatively, the user 10, the second user and/or the third user may also request individual RFID tags to improve a confidence score associated with the identity, due to not having access to a mobile device capable of using the NFC signals and/or to reduce a battery consumption of the mobile device, to provide tracking abilities within the event (e.g., the system 100 may track the RFID tags and provide detailed location information for each of the first user, the second user and/or the third user), or the like. Therefore, upon arriving at the event the user 10 may use the self-service kiosk 250 to generate one or more RFID tags that enable far field verification for the user 10 and each of the guests.

The system 100 may enable the user 10 to transfer access to the event to other users and/or accounts. For example, the user 10 may purchase the access to the event for four people (e.g., four tickets) using a first account and may transfer access to the event for two people (e.g., two tickets) to a second account. Thus, the user 10 (e.g., husband) and a second user (e.g., wife) may attend the event using the access associated with the first account, while a third user and a fourth user may attend the event using the access associated with the second account. Using this framework, the system 100 may reduce or minimize the need for actual tickets, both physical and electronic, as access to the event is associated with an account and users may be verified using one or more far field verification techniques.

In some examples, the system 100 may transfer access to an event to a user (e.g., a third user) that does not have an account. For example, the system 100 may send verification information to the third user and the third user may use the verification information to request RFID tags at the event. Additionally or alternatively, the third user may sign up for a new account and may associate the access to the event with the new account using the verification information. Thus, tickets can be easily transferred to different accounts and/or users not associated with an account, and the system 100 may track every exchange and maintain a full transactional history for each ticket. As tickets are associated with specific accounts and/or users of the accounts, the system 100 may determine the identity of people attending the event, as well as additional information such as previous history, user preferences or the like, as will be discussed in greater detail below.

As used herein, an account may refer to a user account, user profile or the like through which the user 10 may purchase access (e.g., tickets) to an event. The user 10 may be associated with a single account or with multiple accounts without departing from the disclosure. For example, a first user may be associated with a single account through which the first user purchases everything, whereas a second user may be associated with two or more accounts (e.g., personal account and a business account). Similarly, an account may be associated with a single user or with multiple users without departing from the disclosure. For example, an individual account may be associated with a single user (e.g., only the user 10), a household account may be associated with multiple family members (e.g., father, mother, children, etc.), and a business account may be associated with one or more employees (e.g., coworker(s)).

For accounts that are only associated with a single user, in some examples the system 100 may directly associate the user with the account without tracking an identifier associated with the user. For example, while the system 100 may associate an identity (e.g., "John Smith") and/or other information with the account, the system 100 may detect the user 10 and associate the user 10 with the account without verifying the identity of the user 10. Similarly, for accounts that are associated with multiple users, in some examples the system 100 may associate each of the multiple users with the account without tracking an identifier associated with the multiple users. Thus, while the system 100 may detect a first user (e.g., father) and a second user (e.g., mother) using one or more techniques known to one of skill in the art (e.g., facial recognition, near field communication (NFC) technology, radio frequency identification (RFID) technology, or the like), the system 100 may use the detection to determine the account and may not distinguish between the first user and the second user once the account is determined. Therefore, purchasing access to the event for one user may grant access to the event for all of the multiple users, as the system 100 may not distinguish between them.

However, the disclosure is not limited thereto and in some examples, accounts that are associated with multiple users may distinguish between the multiple users and may track each of the multiple users using a unique identifier. For example, FIG. 3A illustrates an account 310 that includes four users each with one or more images associated with the respective user as well as an identifier corresponding to the user. For example a first identifier 312 may be associated with a first user (e.g., father), a second identifier 314 may be associated with the second user (e.g., mother), a third identifier 316 may be associated with a third user (e.g., son) and a fourth identifier 318 may be associated with a fourth user (e.g., daughter).

In some examples, the identifier may correspond to an identity of the user (e.g., "John Smith"), a name (e.g., "John"), a nickname (e.g., "Johnny"), a description (e.g., "father"), a number (e.g., "0") or the like. However, the disclosure is not limited thereto and the identifier may vary over time and/or based on context. Thus, the system 100 may associate a first identifier with the first user at a first time (e.g., during a first event) and may associate a second identifier with the first user at a second time (e.g., during a second event). For example, the system 100 may select an identifier for one or more of the multiple users based on an order of appearance at an event (e.g., third user is detected by the system 100 at a first time and is associated with a first identifier, second user is detected by the system 100 at a second time and is associated with a second identifier, first user is detected by the system 100 at a third time and is associated with a third identifier, etc.). Thus, the system 100 may distinguish between the multiple users in order to require that each user attending the event purchases access to the event individually.

In some examples, the system 100 may generate information corresponding to a user and may associate the information with the user in the account. For example, the system 100 may detect a person associated with the account, may identify the first user (e.g., father), may track the first user throughout the event, may generate information corresponding to the first user (e.g., purchase history, location history, etc.) and may associate the information with the first user in the account. However, in some examples the system 100 may not identify the first user (e.g., determine the identity of the first user) at the time of generating the information. Instead, the system 100 may generate information corresponding to a unique identifier and at a later time may determine that the unique identifier corresponds to a user and associate the information with the user in the account. For example, the system 100 may detect that a person associated with the account is present at the event but may not determine an identify of the person (e.g., distinguish between the first user and the second user associated with the account). Instead, the system 100 may associate the person with a first identifier, may track the person throughout the event, may generate information corresponding to the person (e.g., purchase history, location history, etc.) and may associate the information with the first identifier. During or after the event, the system 100 may determine that the first identifier corresponds to the first user and may associate the information with the first user in the account.

In addition to tracking information associated with a user, the system 100 may track changes in appearance of the user. FIG. 3B illustrates an example of updating facial recognition data to track changes in appearance according to embodiments of the present disclosure. As illustrated in FIG. 3B, the system 100 may retrieve a plurality of images from the account and/or social networking associated with the account and may identify the user 10 in a portion of the images (e.g., images 330). Using the images 330, the system 100 may determine characteristics of the user 10 and may detect changes in appearance 340 associated with the user 10. For example, FIG. 3B illustrates the user 10 clean-shaven, with a moustache and with a beard. The changes in appearance 340 may be used to update the facial recognition data so that a facial recognition algorithm may detect the user 10 regardless of whether the user 10 has facial hair.

While FIG. 3B illustrates the changes in appearance 340 corresponding to changes in facial hair, the disclosure is not limited thereto. Instead, the system 100 may track changes in appearance over a short period of time (e.g., hair styles, hair colors, etc.) and/or a longer period of time (e.g., changes corresponding to aging or developing). For example, the system 100 may track changes in appearance of the third user (e.g., son) and/or the fourth user (e.g., daughter) as they grow and develop from babies to adults. Thus, the system 100 may update the facial recognition data and may ignore previous characteristics that have changed due to the development of the user.

While FIG. 3B illustrates an example of detecting characteristics associated with the user's face, the disclosure is not limited thereto. Instead, the system 100 may determine additional characteristics associated with the user's body (e.g., height, weight or the like) without departing from the disclosure. For example, the system 100 may track changes in appearance of a child as the child gets older, updating the facial recognition to detect the child based on recent changes in appearance to the child's face as well as changes in the child's height, weight and relative size.

As discussed above, facial recognition may be one of several techniques used by the system 100 to verify an account associated with a user 10 to purchase and/or deliver vendor items from a vendor. For example, the system 100 may enable the user 10 to purchase a vendor item (e.g., drink, food, apparel, etc.) using the account without requiring a payment process (e.g., providing cash, credit cards and/or debit cards to the vendor in order to make a purchase) and/or a checkout process (e.g., cashier to ring up items and charge the items to the account). Instead, the system 100 may generate an order including the vendor items and process the order using the account (e.g., receive payment using payment methods associated with the account).

As the system 100 enables the user 10 to place an order remotely (e.g., using the kiosk or the mobile device), the system 100 may reduce a time spent waiting in line to order the vendor item. In addition, the system 100 may indicate to the user 10 (e.g., using the kiosk, the mobile device or a display in proximity to the vendor) a status of the order or the next several orders (e.g., ready for pickup or being prepared), which may reduce an amount of time spent waiting for the vendor item to be ready for delivery to the user 10. In some examples, the system 100 may deliver the vendor items to the user 10.

FIG. 4 illustrates examples of delivering vendor items according to embodiments of the present disclosure. As illustrated in FIG. 4, the user 10 may remotely place an order (e.g., using a kiosk, mobile device or the like) and the system 100 may process the order using the account and deliver the vendor item to the user 10.

As illustrated in FIG. 4, the user 10 may remotely place an order for delivery 420. The system 100 may receive the order and process the order using the account. To fulfill the order, the system 100 may determine a delivery location 422 associated with the user 10 and may determine vendor(s) 410 in proximity to the delivery location 422 that have the vendor items in stock and are available to deliver the vendor items to the delivery location 422. The system 100 may send an instruction to the vendor(s) 410 deliver the vendor items to the delivery location 422, such that the user 10 receives the vendor items without moving from his seat.

In some examples, the user 10 may remotely place an order for static pickup 440 and the system 100 may receive the order and process the order using the account. To fulfill the order, the system 100 may determine a user location 442 associated with the user 10 when the order was placed and may determine vendor(s) 410 in proximity to the user location 442 that have the vendor items in stock. The system 100 may send an instruction to the vendor (s) 410 to prepare the vendor items for pickup at a pickup location 444 and may send an instruction to the user 10 to pickup the vendor items at the pickup location 444. In some examples, the system 100 may determine an estimated time of pickup for the vendor items based on a current status of the vendor(s) 410. When the user 10 arrives at the pickup location 444, the system 100 may detect the user 10 at the pickup location 444 and verify the account associated with the user 10, as discussed in greater detail above with regard to FIGS. 2A-2D. After verifying the account, the system 100 may send an instruction to the vendor(s) 410 to deliver the vendor items to the user 10. For example, the pickup location 444 may include an automated device that detects the user 10 (e.g., using facial recognition, NFC technology and/or RFID technology) in proximity to the automated device and individually dispenses the vendor items to the user 10.

In some examples, the user 10 may remotely place an order for dynamic pickup 460 and the system 100 may receive the order and process the order using the account. To fulfill the order, the system 100 may generate an indication of the vendor items included in the order and associate the indication with the account. The system 100 may enable the user 10 to pick up the vendor item from multiple vendors (e.g., pickup locations 462) instead of a specific vendor. For example, the user 10 may order a concession item (e.g., hot dog) while near a first vendor but may pick up the concession item at a second vendor. Thus, the order payment is processed through the account but the order is not tied to a specific vendor, enabling the user 10 flexibility in where to pick up the vendor item.

When the user 10 arrives at one of the pickup locations 462, the system 100 may detect the user 10 in proximity to one of the pickup locations 462 and verify the account associated with the user 10, as discussed in greater detail above with regard to FIGS. 2A-2D. After verifying the account, the system 100 may send an instruction to the vendor(s) 410 to deliver the vendor items to the user 10. For example, the pickup locations 462 may include an automated device that detects the user 10 (e.g., using facial recognition, NFC technology and/or RFID technology) in proximity to the automated device, retrieves the vendor items and individually dispenses the vendor items to the user 10. However, the disclosure is not limited thereto. Instead, the pickup locations 462 may include employees that verify the vendor items associated with the user 10 and deliver the vendor items to the user 10 without departing from the disclosure. Additionally or alternatively, the user 10 may select the vendor items at the pickup locations 462 and walk through a checkpoint that verifies that the vendor items are associated with the user 10 without departing from the disclosure.

FIG. 5 illustrates examples of tracking data according to embodiments of the present disclosure. As illustrated in FIG. 5, a venue 500 may include a stage 502, a standing area 504 and a seating area 506. In some examples, the system 100 may generate individual data 510 associated with the user 10. For example, the system 100 may track the user 10 using the techniques discussed above and generate tracking data 512 specific to the user 10, which corresponds to a location of the user 10 within the venue 500 over a period of time.

The tracking data 512 may indicate the locations that the user 10 visited within the venue. Thus, the system 100 may identify an exact location of the user 10 at a specific time, may determine frequent locations or a preferred area within the venue, may determine vendors that the user 10 visited or the like. Using the location information, in some examples the system 100 may identify the user 10 in image data captured at the event (e.g., images taken by professional event photographers, within a photo booth at the venue, or the like) and may upload the image data to the account automatically. Additionally or alternatively, the system 100 may generate a personalized highlight video of the event taking into account the location information. For example, the personalized highlight video may include and/or emphasize the locations that the user 10 visited. Additionally or alternatively, the personalized highlight video may be generated based on a vantage point associated with the location(s). For example, the system 100 may capture image data of the event (e.g., concert) from multiple camera(s) 116 within the venue, may determine a location from which the user 10 viewed the event (e.g., seats at the concert) and may generate the personalized highlight video to capture the concert from the perspective of the user 10.

In some examples, the system 100 may add the tracking data 512 to user history that includes additional tracking data over a longer period of time, such that the user history may include location information corresponding to multiple events. The system 100 may use the user history to generate recommendations to the user 10 or send promotional information. For example, the system 100 may determine that the user 10 frequently visits a particular vendor and may send advertisements and/or discounts associated with the vendor to the user 10.

Additionally or alternatively, the system 100 may associate purchases made by the user 10 in the user history and may use the user history to predict a path of the user 10 in future events and/or to estimate a predicted demand of the user 10. For example, the system 100 may detect that the user 10 is walking in a first direction and may predict that the user 10 is walking to a particular location and/or vendor (e.g., vendor 30). In some examples, the system 100 may estimate the predicted demand of the user 10 and send the predicted demand to the vendor 30 to assist the vendor 30 in anticipating a purchase of the user 10. For example, the vendor 30 may increase supply in response to the predicted demand (e.g., cook additional food) and/or request supply from another vendor within the venue. Thus, the system 100 may enable the vendors to dynamically allocate supply within the venue to meet a demand.

In other examples, the system 100 may generate aggregate data 520 that tracks locations of multiple users over a period of time. The system 100 may use the aggregate data 520 to generate information about traffic patterns or other data associated with the venue. For example, the system 100 may generate a heat map 522 indicating a relative amount of foot traffic within the venue 500, which illustrates bottlenecks and choke points within the venue, areas of the venue that were associated with high foot traffic or the like. Additionally or alternatively, the system 100 may determine a predicted demand for multiple users and may determine an aggregate predicted demand for the venue as a whole or for individual vendors within the venue. Thus, the vendors may use the aggregate predicted demand to determine an amount of items to stock and/or to set prices or generate promotions for future events.

Figure 7:
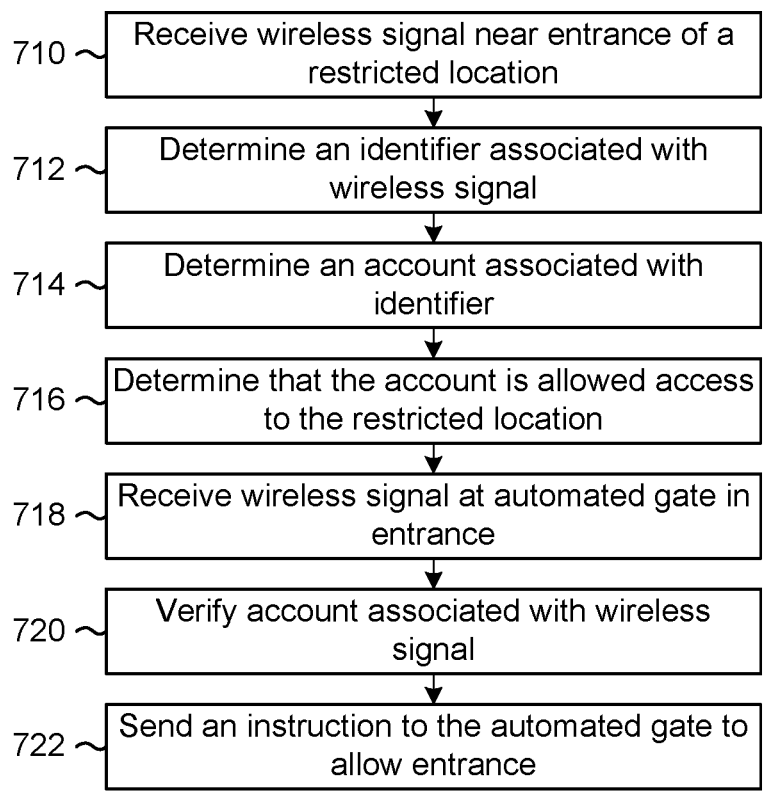
FIG. 7 is a flowchart conceptually illustrating an example method of verifying an identity using wireless signals according to embodiments of the present disclosure.

The system 100 may identify the user 10, determine an account associated with the user 10 and determine that the user 10 is allowed access to the restricted location (e.g., event). However, the system 100 also needs to be configured to allow access and deny access, which can be done using multiple techniques known to one of skill in the art. In some examples, the system 100 may include automated gates that may detect the user 10 as the user 10 approaches, determine whether to allow or deny access to the user 10 and either open to allow access or remain closed to deny access to the user 10. FIG. 6 illustrates an example of detecting the user 10 using facial recognition, whereas FIG. 7 illustrates an example of detecting the user 10 using wireless signals.

FIG. 6 is a flowchart conceptually illustrating an example method of verifying an identity using facial recognition according to embodiments of the present disclosure. As illustrated in FIG. 6, the system 100 may receive (610) first image data corresponding to an entrance to a restricted location. For example, the system 100 may receive image data captured by a security camera in an entrance to a venue.

The system 100 may detect (612) a face represented in the first image data, may determine (614) an identifier associated with the face and may determine (616) an account associated with the identifier. For example, the system 100 may perform facial recognition on the first image data to determine that the face corresponds to the user 10 and to determine the account associated with the user 10.

The system 100 may determine (618) that the account is allowed access to the restricted location (e.g., the user 10 purchased tickets) and may allow the user 10 to enter the restricted location. For example, the system 100 may receive (620) second image data corresponding to an automated gate in the entrance, may detect (622) that the face is represented in the second image data and may send (624) an instruction to the automated gate to allow entrance to the user 10.

FIG. 7 is a flowchart conceptually illustrating an example method of verifying an identity using wireless signals according to embodiments of the present disclosure. As illustrated in FIG. 7, the system 100 may receive (710) a wireless signal near an entrance of a restricted location. For example, the user 10 may have a mobile device running an application that transmits a wireless signal such as a NFC signal, and the system 100 may detect the wireless signal using a NFC sensor.

The system 100 may determine (712) an identifier associated with the wireless signal, may determine (714) an account associated with the identifier, and may determine (716) that the account is allowed access to the restricted location. For example, the wireless signal output by the mobile device may include information that indicates the account and/or an identity of the user 10. The system 100 may determine the account, verify that the account purchased access to the event and that another user hadn't already used the access to enter the event.

The system 100 may receive (718) the wireless signal at an automated gate in the entrance, may verify (720) that the account is associated with the wireless signal and may send (722) an instruction to the automated gate to allow entrance to the user 10.

While FIG. 6 illustrates an example of detecting the user 10 using facial recognition and FIG. 7 illustrates an example of detecting the user 10 using wireless signals, for ease of explanation the following drawings illustrate examples of detecting the user 10 using facial recognition. However, the examples may be modified to detect the user 10 using the wireless signals without departing from the disclosure.

In some examples, the system 100 may differentiate between users associated with the account, such that purchasing access to the event (e.g., a single ticket) only allows a single user to access the event. Therefore, the system 100 may monitor a total number of tickets and a number of claimed tickets to determine if a user seeking entrance to the event may be allowed to enter. For example, if the account purchased access to the event for two people (e.g., two tickets), the system 100 may determine that two tickets are available and allow a first user to enter, determine that one ticket is available and allow a second user to enter, but determine that no tickets are available and deny access to a third user.

FIGS. 8A-8B are flowcharts conceptually illustrating example methods of determining to allow or deny access to a restricted location according to embodiments of the present disclosure. FIGS. 8A-8B illustrate examples of the system 100 allowing a first person associated with an account to enter the event and then allowing or denying access to a second person based on whether the account purchased additional access to the event. As illustrated in FIG. 8A, the system 100 may receive (810) first image data corresponding to an entrance of a restricted location, may detect (812) a second face represented in the first image data, may determine (814) a second identifier associated with the second face and may determine (816) that the second identifier is associated with an account. The system 100 may determine (818) a first number of people associated with the account that are allowed access (e.g., a number of tickets purchased by the account), may determine (820) a second number of people associated with the account that were provided access (e.g., a number of tickets already used) and may determine (822) that the first number is greater than the second number (e.g., there are tickets remaining on the account). Thus, the system 100 may determine that the second person may be allowed access to the event.

The system 100 may receive (824) second image data corresponding to an automated gate in the entrance, may identify (826) that the second face is represented in the second image data and may send (828) an instruction to the automated gate to allow entrance to the second person. Thus, the system 100 may allow the second person to enter the event.

As illustrated in FIG. 8B, the system 100 may receive (810) first image data corresponding to an entrance of a restricted location, may detect (812) a second face represented in the first image data, may determine (814) a second identifier associated with the second face and may determine (816) that the second identifier is associated with an account. The system 100 may determine (818) a first number of people associated with the account that are allowed access (e.g., a number of tickets purchased by the account), may determine (820) a second number of people associated with the account that were provided access (e.g., a number of tickets already used) and may determine (850) that the first number is less than or equal to the second number (e.g., there are no tickets remaining on the account). Thus, the system 100 may determine that the second person is not allowed access to the event.

The system 100 may receive (824) second image data corresponding to an automated gate in the entrance, may identify (826) that the second face is represented in the second image data and may send (852) an instruction to the automated gate to deny entrance to the second person. Thus, the system 100 may restrict access to the event to the second person.

Figure 9:
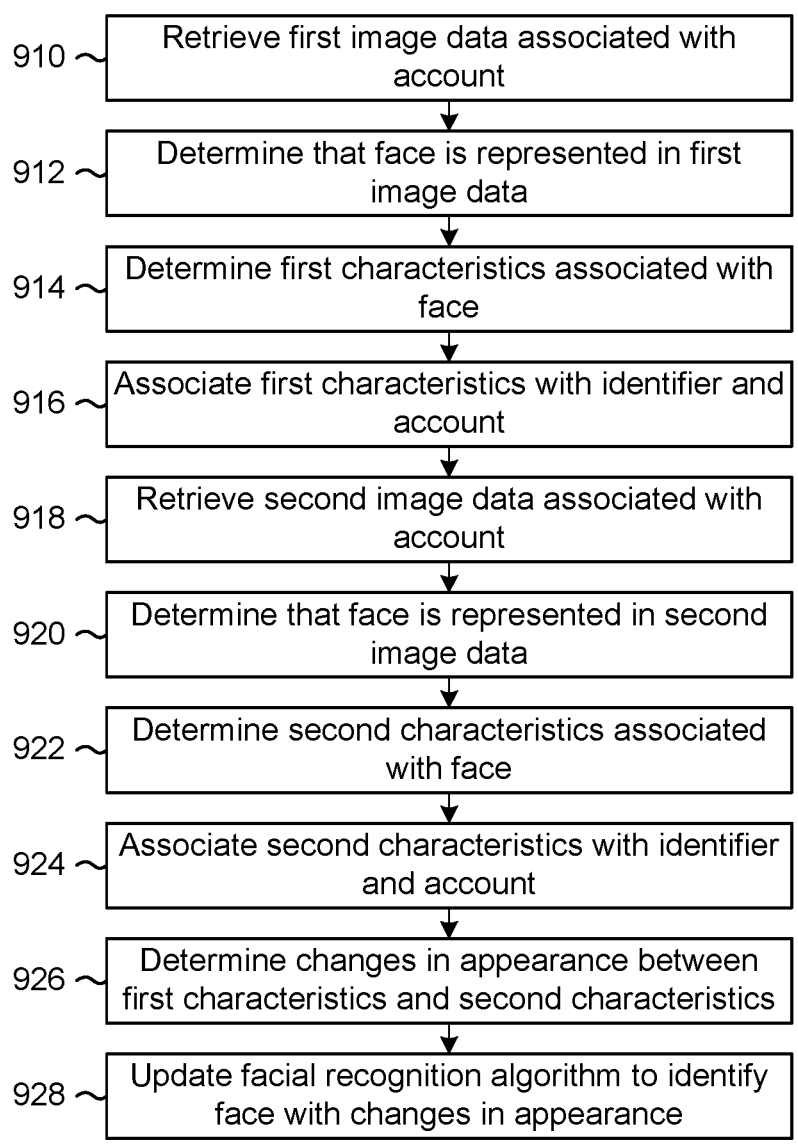
FIG. 9 is a flowchart conceptually illustrating an example method of updating facial recognition data to track changes in appearance according to embodiments of the present disclosure.

FIG. 9 is a flowchart conceptually illustrating an example method of updating facial recognition data to track changes in appearance according to embodiments of the present disclosure, as discussed above with regard to FIG. 3B. As illustrated in FIG. 9, the system 100 may retrieve (910) first image data associated with an account, determine (912) that a face associated with a first user is represented in the first image data, may determine (914) first characteristics associated with the face and associate (916) the first characteristics with an identifier corresponding to the first user and the account.

The system 100 may retrieve (918) second image data associated with the account, determine (920) that the face is represented in the second image data, may determine (922) second characteristics associated with the face and associate (924) the second characteristics with the identifier and the account. The first image data and/or the second image data may be captured by the system 100, may be retrieved from the account (e.g., pictures uploaded on the account), and/or may be retrieved from social networks associated with the account.

The system 100 may then determine (926) changes in appearance between the first characteristics and the second characteristics and update (928) facial recognition data to identify the face based on the changes in appearance.

While FIG. 9 illustrates an example of detecting characteristics associated with the user's face, the disclosure is not limited thereto. Instead, the system 100 may determine additional characteristics associated with the user's body (e.g., height, weight or the like) without departing from the disclosure. For example, the system 100 may track changes in appearance of a child as the child gets older, updating the facial recognition to detect the child based on recent changes in appearance to the child's face as well as changes in the child's height, weight and relative size.

Figure 10:
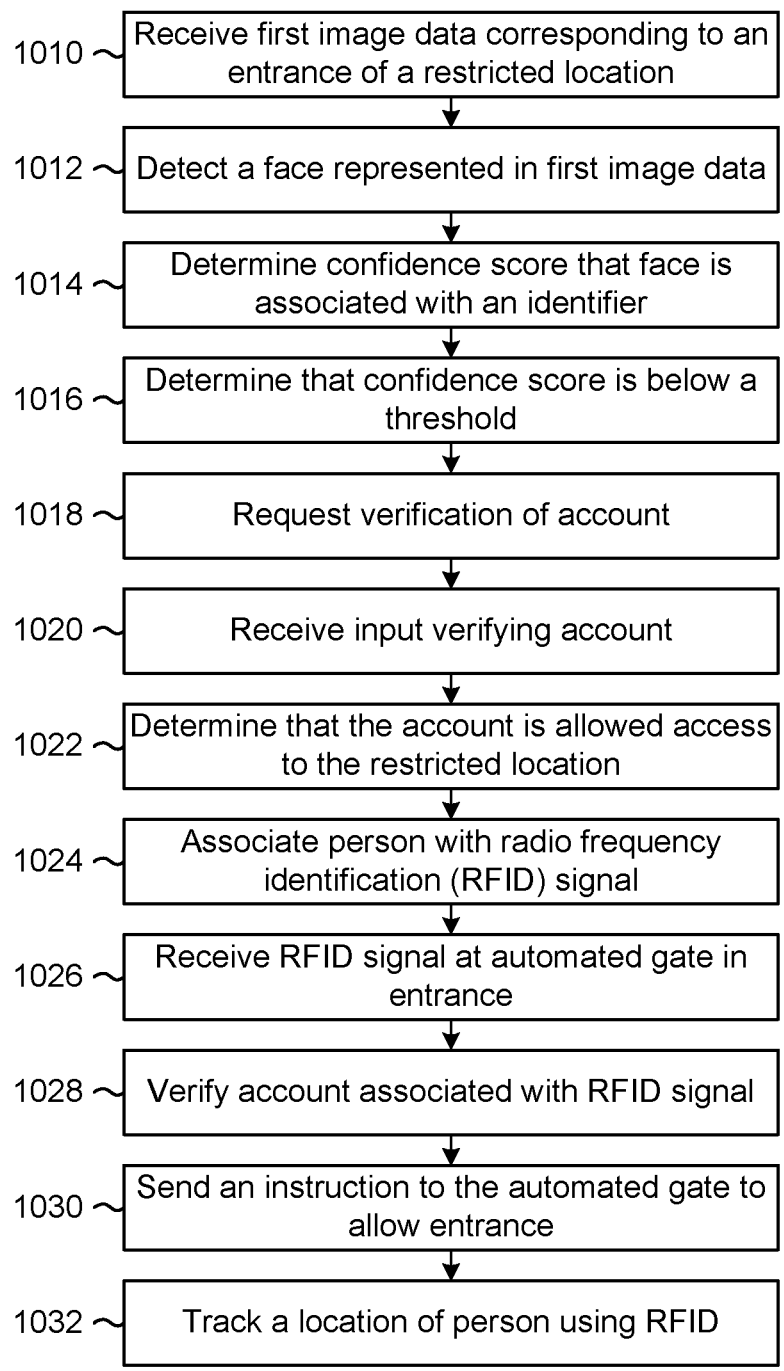
FIG. 10 is a flowchart conceptually illustrating an example method of failing to determine an identity using facial recognition and issuing a radio frequency identification device according to embodiments of the present disclosure.

FIG. 10 is a flowchart conceptually illustrating an example method of failing to determine an identity using facial recognition and issuing a radio frequency identification device according to embodiments of the present disclosure. As illustrated n FIG. 10, the system 100 may receive (1010) first image data corresponding to an entrance of a restricted location, may detect (1012) a face represented in the first image data and may determine (1014) a confidence score that the face is associated with an identifier. For example, the system 100 may determine a first confidence score that the face is associated with a first identifier (e.g., first user associated with a first account) and may determine a second confidence score that the face is associated with a second identifier (e.g., second user associated with the first account or a second account).

The system 100 may determine (1016) that the confidence score is below a threshold, may request (1018) verification of the account by the user, and may receive (1020) input verifying the account. For example, the user may verify the account using NFC technology, RFID technology, a biometric scan, account information, identification information or the like. The system 100 may determine (1022) that the account is allowed access to the restricted location and may associate (1024) the person with a radio frequency identification (RFID) signal. For example, the system 100 may give an RFID bracelet to the person for verifying the account and conducting transactions using the account.

The system 100 may receive (1026) an RFID signal at an automated gate in the entrance, may verify (1028) the account associated with the RFID signal and may send (1030) an instruction to the automated gate to allow entrance to the event. The system 100 may then track (1032) a location of the person using the RFID signals, as discussed above with regard to FIG. 5.

Figure 11:
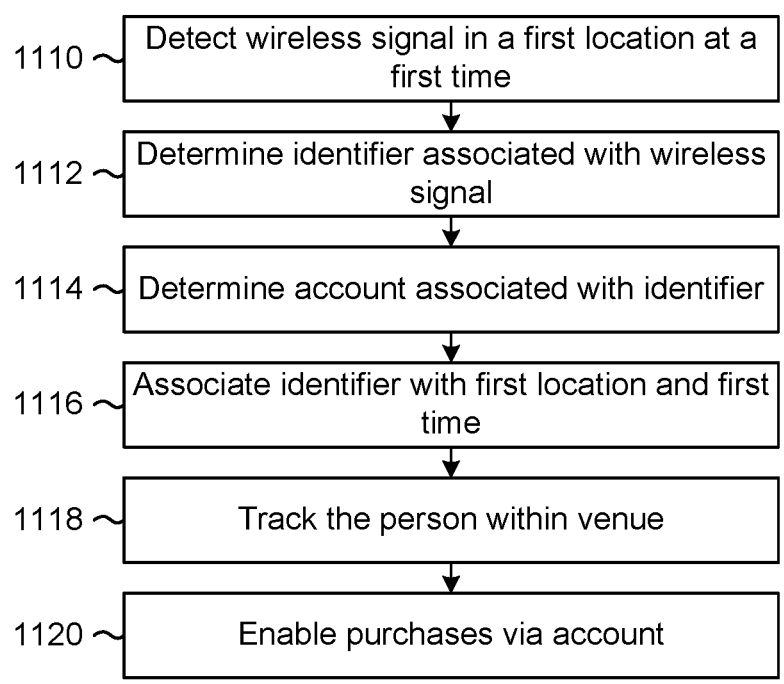
FIG. 11 is a flowchart conceptually illustrating an example method of tracking a location using a wireless signal according to embodiments of the present disclosure.

FIG. 11 is a flowchart conceptually illustrating an example method of tracking a location using a wireless signal according to embodiments of the present disclosure. The flowchart illustrated in FIG. 11 is similar to the flowchart illustrated in FIG. 1B, except that the flowchart illustrated in FIG. 11 detects the user using wireless signals instead of facial recognition. As illustrated in FIG. 11, the system 100 may detect (1110) a wireless signal in a first location at a first time, may determine (1112) an identifier associated with the wireless signal and may determine (1114) an account associated with the identifier. The system 100 may associate (1116) the identifier with the first location and the first time, may track (1118) the person within the venue and may enable (1120) purchases via the account.

Figure 12C:
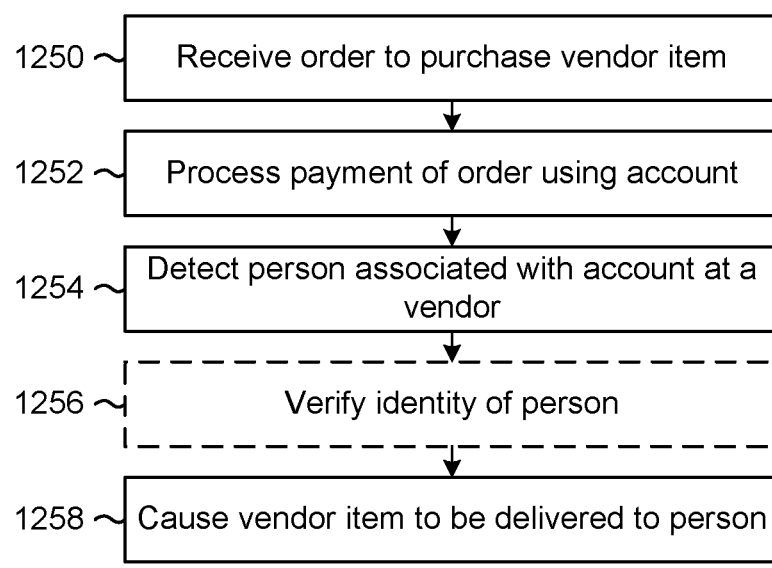

FIGS. 12A-12C are flowcharts conceptually illustrating example methods of purchasing and delivering concession items according to embodiments of the present disclosure. The flowcharts illustrated in FIG. 12A-12C correspond to the delivery methods described above with regard to FIG. 4. As illustrated in FIG. 12A, the system 100 may receive (1210) an order to purchase a vendor item from an account and may process (1212) payment of the order using the account. The system 100 may determine (1214) a location associated with the person, may determine (1216) a vendor in proximity to the location and may send (1218) the location and an indication of the order (e.g., vendor items included in the order) to the vendor. The system 100 may optionally verify (1220) an identity of the person prior to delivering the item. For example, the system 100 may verify the identity of the person and indicate to the vendor that the person is verified. Additionally or alternatively, the system 100 may send the identity of the person to the vendor and the vendor may verify the identity without the system 100. For example, the vendor may have a mobile device that verifies the identity of the person using the techniques discussed above.

As illustrated in FIG. 12B, the system 100 may receive (1230) an order to purchase a vendor item from the account and may process (1232) payment of the order using the account. The system 100 may determine (1234) a first location of a person associated with the account (e.g., user 10), may determine (1236) a vendor having the vendor item in stock in proximity to the first location and may determine (1238) a second location associated with the vendor. The system 100 may send (1240) a message to the person indicating the second location. In some examples, the system 100 may optionally send (1242) a message to the vendor indicating the vendor item. For example, the system 100 may provide the vendor notice that the person will be arriving for the vendor item in case the vendor needs to prepare the vendor item prior to delivering the vendor item to the person.

The system 100 may detect (1244) the person at the second location. For example, the system 100 may use facial recognition, NFC technology and/or RFID technology to detect the person. The system 100 may optionally verify (1246) an identity of the person and may cause (1248) the vendor item to be delivered to the person. For example, the system 100 may verify the identity of the person to increase a security associated with delivering the vendor item, such as when selling alcohol or delivering an expensive order.

As illustrated in FIG. 12C, the system 100 may receive (1250) an order to purchase a vendor item from the account and may process (1252) payment of the order using the account. The system 100 may detect (1254) the person associated with the account at a vendor, may optionally verify (1256) the identity of the person and may cause (1258) the vendor item to be delivered to the person. For example, the system 100 may verify the identity of the person to increase a security associated with delivering the vendor item, such as when selling alcohol or delivering an expensive order.

The server(s) 120 may include or refer to data regarding user accounts, shown by the user profile storage 1302 illustrated in FIG. 13. The user profile storage 1302 may be located proximate to server(s) 120, or may otherwise be in communication with various components of the system 100, for example over network(s) 99. The user profile storage 1302 may include a variety of information related to individual users, households, accounts, etc. that interact with the system 100. For illustration, as shown in FIG. 13, the user profile storage 1302 may include data regarding the devices associated with particular individual user accounts 1304. In an example, the user profile storage 1302 is a cloud-based storage. Such data may include device identifier (ID) and internet protocol (IP) address information for different devices, such as mobile devices 230, as well as names by which the devices may be referred to by a user. Additional information may be stored in the user profile storage 1302, including information about identities of the individual users, biometric data (e.g., facial recognition data, fingerprint data, etc.), RFID data, user history data and/or any other information associated with the individual users that is associated with the account.

As illustrated in FIG. 14, components of the system 100 may be connected over network(s) 99. The components of the system 100 may include network adapters that connect to the network(s) 99 through either wired or wireless connections. For example, the system 100 may include components such as a gate 112, sensor(s) 114, camera(s) 116, microphone(s) 118, a mobile device 230*a* (e.g., smart phone), a mobile device 230*b* (e.g., smart watch), a kiosk 250, vendor server(s) 1410, user profile storage 1302, server(s) 120, and/or other components not illustrated in FIG. 14. While FIG. 14 illustrates the sensor(s) 114, the camera(s) 116 and the microphone(s) 118 connecting directly to the network(s) 99, the disclosure is not limited thereto and the sensor(s) 114, the camera(s) 116, and/or the microphone(s) 118 may be included in another component (e.g., the gate 112, the kiosk 250, or the like) that is connected to the network(s) 99 without departing from the disclosure.

The vendor server(s) 1410 may be associated with the vendor 30 and may communicate with the server(s) 120. For example, the vendor server(s) 1410 may send an indication of current inventory, wait times, current orders or the like so that the server(s) 120 may select between different vendors. In addition, the server(s) 120 may send an indication of an order, payment of the order, delivery location, pickup location and/or account information to the vendor server(s) 1410 when a user 10 purchases vendor items using an account.

The network(s) 99 may be a local or private network or may be part of a wider network. For example, the network(s) 99 may include a wired local area network (LAN), a wireless local area network (WLAN) (such as WiFi), Bluetooth, and/or wireless network, such as a Long Term Evolution (LTE) network, WiMAX network, 3G network, etc.

While the examples described herein illustrate the server(s) 120 performing multiple functions, the disclosure is not limited thereto. Instead, additional devices (e.g., gate 112, kiosk and/or other components not illustrated in the drawings) may perform any of the functions described herein without departing from the disclosure.

FIG. 15 is a block diagram conceptually illustrating server(s) 120 that may be used with the described system 100. Multiple such server(s) 120 may be included in the system without departing from the disclosure.

In operation, the system 100 may include computer-readable and computer-executable instructions that reside on the server(s) 120, as will be discussed further below. The server(s) 120 may be an electronic device capable of determining an identity of a person and/or tracking a location of the person within a venue. While the server(s) 120 are examples of a computing device, the disclosure is not limited to a server and may be any electronic devices, including computers (e.g., a desktop, a laptop, a server or the like), portable devices (e.g., a camera (such as a 360° video camera, a security camera, a mounted camera, a portable camera or the like), smart phone, tablet or the like), media devices (e.g., televisions, video game consoles or the like) or the like. The server(s) 120 may also be a component of any of the abovementioned devices or systems.

As illustrated in FIG. 15, the server(s) 120 may include an address/data bus 1502 for conveying data among components of the server(s) 120. Each component within the server(s) 120 may also be directly connected to other components in addition to (or instead of) being connected to other components across the bus 1502.

The server(s) 120 may include one or more controllers/processors 1504, that may each include a central processing unit (CPU) for processing data and computer-readable instructions, and a memory 1506 for storing data and instructions. The memory 1506 may include volatile random access memory (RAM), non-volatile read only memory (ROM), non-volatile magnetoresistive (MRAM) and/or other types of memory. The server(s) 120 may also include a data storage component 1508, for storing data and controller/processor-executable instructions (e.g., instructions to perform the algorithm illustrated in FIGS. 1A-1B, 6, 7, 8A-8B, 9, 10, 11 and/or 12A-12C). The data storage component 1508 may include one or more non-volatile storage types such as magnetic storage, optical storage, solid-state storage, etc. The server(s) 120 may also be connected to removable or external non-volatile memory and/or storage (such as a removable memory card, memory key drive, networked storage, etc.) through the input/output device interfaces 1510.

The server(s) 120 includes input/output device interfaces 1510. A variety of components may be connected through the input/output device interfaces 1510, such as, speakers (not shown), a display (not shown), camera(s) 116 and/or microphone(s) 118. However, the disclosure is not limited thereto and the server(s) 120 may not include integrated speakers, display camera(s) 116 and/or microphone(s) 118. Thus, the speakers, display, camera(s) 116, microphone(s) 118 and/or other components may be integrated into the server(s) 120 or may be separate from the server(s) 120 without departing from the disclosure.

The input/output device interfaces 1510 may be configured to operate with network(s) 99, for example a wired local area network (LAN), a wireless local area network (WLAN) (such as WiFi), Bluetooth, ZigBee and/or wireless networks, such as a Long Term Evolution (LTE) network, WiMAX network, 3G network, etc. The network(s) 99 may include a local or private network or may include a wide network such as the internet. Devices may be connected to the network(s) 99 through either wired or wireless connections.

The input/output device interfaces 1510 may also include an interface for an external peripheral device connection such as universal serial bus (USB), FireWire, Thunderbolt, Ethernet port or other connection protocol that may connect to network(s) 99. The input/output device interfaces 1510 may also include a connection to an antenna (not shown) to connect one or more network(s) 99 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The server(s) 120 may include an identification module 1524, which may comprise processor-executable instructions stored in storage 1508 to be executed by controller(s)/processor(s) 1504 (e.g., software, firmware, hardware, or some combination thereof). For example, components of the identification module 1524 may be part of a software application running in the foreground and/or background on the server(s) 120. The identification module 1524 may control the server(s) 120 as discussed above, for example with regard to FIGS. 1A-1B, 6, 7, 8A-8B, 9, 10, 11 and/or 12A-12C. Some or all of the controllers/modules of the progress module 1524 may be executable instructions that may be embedded in hardware or firmware in addition to, or instead of, software. In one embodiment, the server(s) 120 may operate using an Android operating system (such as Android 4.3 Jelly Bean, Android 4.4 KitKat or the like), an Amazon operating system (such as FireOS or the like), or any other suitable operating system.

Executable computer instructions for operating the server(s) 120 and its various components may be executed by the controller(s)/processor(s) 1504, using the memory 1506 as temporary "working" storage at runtime. The executable instructions may be stored in a non-transitory manner in non-volatile memory 1506, storage 1508, or an external device. Alternatively, some or all of the executable instructions may be embedded in hardware or firmware in addition to or instead of software.

The components of the server(s) 120, as illustrated in FIG. 15, are exemplary, and may be located a stand-alone device or may be included, in whole or in part, as a component of a larger device or system.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, video capturing devices, video game consoles, speech processing systems, distributed computing environments, etc. Thus the modules, components and/or processes described above may be combined or rearranged without departing from the scope of the present disclosure. The functionality of any module described above may be allocated among multiple modules, or combined with a different module. As discussed above, any or all of the modules may be embodied in one or more general-purpose microprocessors, or in one or more special-purpose digital signal processors or other dedicated microprocessing hardware. One or more modules may also be embodied in software implemented by a processing unit. Further, one or more of the modules may be omitted from the processes entirely.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for allowing entry to an event,
the method comprising:
during a first time period:
receiving an order to purchase access to an event, the order associated with a first user account,
receiving payment corresponding to the order, and
storing an indication that at least one individual associated with the first user account is authorized to access the event; and
during a second time period after the first time period:
receiving first image data from a camera located at an entrance to the event,
detecting that a first face is represented in the first image data, the first face associated with a first person,
comparing, using facial recognition processing, at least a first portion of the first image data with at least first face data and second face data, wherein:
the first face data represents a second face and is associated with the first user account,
the second face data represents a third face and is associated with a second user account,
the second face and the third face are associated with different people, and
the first user account is different than the second user account,
determining that the first face represented in the first image data corresponds to the second face represented in the first face data,
determining, based at least in part on the first face corresponding to the second face, that the first user account is associated with the first face,
determining, based at least in part on the indication and the first user account being associated with the first face, that at least the first person is authorized access to the event,
determining, using the camera, that the first person is approaching an automated gate in the entrance, the automated gate configured to allow access to the event, and
sending an instruction to the automated gate to allow access to the event to be granted to the first person.

2. The computer-implemented method of claim 1, further comprising:
detecting that a fourth face is represented in the first image data, the fourth face associated with a second person;
comparing, using the facial recognition processing, at least a second portion of the first image data with third face data representing a fifth face associated with a third user account, wherein:
the second face, the third face, and the fifth face are associated with different people, and
the third user account is different than each of the first user account and the second user account;

determining that the fourth face represented in the first image data corresponds to the fifth face represented in the third face data;
determining, based at least in part on the fourth face corresponding to the fifth face, that the first user account is associated with the fourth face;
determining, based at least in part on the indication and the first user account being associated with the fourth face, that the second person is authorized access to the event;
receiving second image data from a second camera located at a second automated gate in the entrance;
detecting that the fourth face is represented in the second image data; and
causing access to the event to be granted to the second person.

3. The computer-implemented method of claim 1, further comprising:
receiving second image data from a camera located at the entrance to the event;
detecting that a fourth face is represented in the second image data, the fourth face associated with a second person;
comparing, using the facial recognition processing, at least a portion of the second image data with third face data representing a fifth face associated with a third user account, wherein:
the second face, the third face, and the fifth face are associated with different people, and
the third user account is different than each of the first user account and the second user account;
determining that the fourth face represented in the second image data corresponds to the fifth face represented in the third face data;
determining, based at least in part on the fourth face corresponding to the fifth face, that the first user account is associated with the fourth face;
determining, using the indication, that only one individual associated with the first user account is authorized access to the event;
determining that the first person was already provided access to the event; and
causing access to the event to be denied to the second person.

4. The computer-implemented method of claim 1, further comprising, prior to receiving the first image data:
receiving second image data including a representation of the second face;
determining, using the second image data, first characteristics associated with the second face, the first characteristics corresponding to the second face being clean shaven;
associating the first characteristics with the first face data and the first user account;
retrieving third image data associated with the first user account, the third image data corresponding to a plurality of images;
detecting that the second face is represented in the third image data;
determining, using the third image data, second characteristics associated with the second face, the second characteristics corresponding to the second face having a beard;
associating the second characteristics with the first face data and the first user account;
determining changes between the first characteristics and the second characteristics; and
updating facial recognition data for a facial recognition algorithm based on the changes, the facial recognition algorithm configured to compare at least the first portion of the first image data with at least the first face data based at least in part on the first characteristics and the second characteristics.

5. A computer-implemented method, comprising:
receiving, from one or more cameras corresponding to an entrance to a location, first image data;
detecting that a first face is represented in the first image data;
comparing, using facial recognition processing, at least a portion of the first image data with at least first face data and second face data, wherein:
the first face data represents a second face and is associated with a first user account,
the second face data represents a third face and is associated with a second user account,
the second face and the third face are associated with different people, and
the first user account is different than the second user account;
determining that the first face represented in the first image data corresponds to the second face represented in the first face data;
determining, based at least in part on the first face corresponding to the second face, that the first user account is associated with the first face;
determining that at least a first person associated with the first user account is allowed access to the location;
determining, using the one or more cameras, that the first person is approaching an automated gate in the entrance, the automated gate configured to allow access to the location; and
sending an instruction to the automated gate to allow access to the location to be granted to the first person.

6. The computer-implemented method of claim 5, wherein determining that the first person is approaching the automated gate further comprises:
receiving second image data corresponding to the automated gate;
detecting that the first face is represented in the second image data; and
determining that the first person is requesting access to the location.

7. The computer-implemented method of claim 5, wherein determining that the first person is approaching the automated gate further comprises:
receiving, from the automated gate, a wireless signal output by a device associated with the first person; and
determining, based at least in part on the wireless signal, that the first person is approaching the automated gate.

8. The computer-implemented method of claim 5, further comprising:
receiving, from the one or more cameras, second image data corresponding to the entrance;
detecting that a fourth face is represented in the second image data, the fourth face associated with a second person;
comparing, using the facial recognition processing, at least a portion of the second image data with at least third face data representing a fifth face that is associated with a third user account, wherein:
the second face, the third face, and the fifth face are associated with different people, and
the third user account is different than each of the first user account and the second user account;

determining a confidence score that the fourth face corresponds to the fifth face;
determining that the confidence score is below a threshold;
requesting the second person to verify that the third user account is associated with the second person;
verifying that the third user account is associated with the second person;
determining that the second person is allowed access to the location;
associating the second person with a radio frequency identification signal;
causing access to the location to be granted to the second person; and
tracking a position of the second person using the radio frequency identification signal.

9. The computer-implemented method of claim 5, further comprising:
receiving, from the one or more cameras, second image data corresponding to the entrance;
detecting that a fourth face is represented in the second image data, the fourth face associated with a second person;
comparing, using the facial recognition processing, at least a portion of the second image data with at least third face data representing a fifth face that is associated with a third user account, wherein:
the second face, the third face, and the fifth face are associated with different people, and
the third user account is different than each of the first user account and the second user account;
determining that the fourth face represented in the second image data corresponds to the fifth face represented in the third face data;
determining, based at least in part on the fourth face corresponding to the fifth face, that the third user account is associated with the fourth face;
determining a first number of people associated with the third user account that are authorized access to the location;
determining a second number of people associated with the third user account that have been provided access to the location;
determining that the first number is greater than the second number; and
causing access to the location to be granted to the second person.

10. The computer-implemented method of claim 5, further comprising:
receiving, from the one or more cameras, second image data corresponding to the entrance;
detecting that a fourth face is represented in the second image data, the fourth face associated with a second person;
comparing, using the facial recognition processing, at least a portion of the second image data with at least third face data representing a fifth face that is associated with a third user account, wherein:
the second face, the third face, and the fifth face are associated with different people, and
the third user account is different than each of the first user account and the second user account;
determining that the fourth face represented in the second image data corresponds to the fifth face represented in the third face data;
determining, based at least in part on the fourth face corresponding to the fifth face, that the first user account is associated with the fourth face;
determining a first number of people associated with the third user account that are authorized access to the location;
determining a second number of people associated with the third user account that have been provided access to the location;
determining that the first number is less than or equal to the second number; and
causing access to the location to be denied to the second person.

11. The computer-implemented method of claim 5, further comprising, prior to receiving the first image data:
receiving second image data;
detecting that the second face is represented in the second image data;
determining, using the second image data, first characteristics associated with the second face;
associating the first characteristics with the first face data and the first user account;
retrieving third image data associated with the first user account;
detecting that the second face is represented in the third image data;
determining, using the third image data, second characteristics associated with the second face;
associating the second characteristics with the first face data and the first user account;
determining changes between the first characteristics and the second characteristics; and
updating facial recognition data for a facial recognition algorithm based on the changes, the facial recognition algorithm configured to compare at least the portion of the first image data with at least the first face data based at least in part on the first characteristics and the second characteristics.

12. The computer-implemented method of claim 5, wherein the determining that the first user account is associated with the first face further comprises at least one of:
receiving a near-field communication signal output by a device associated with the first person;
receiving a radio frequency identification signal associated with the first person;
identifying the first person using a biometric device; and
receiving account information from the first person, the account information verifying the first user account.

13. A system, comprising:
at least one processor; and
memory including instructions operable to be executed by the at least one processor to cause the system to:
receive, from one or more cameras corresponding to an entrance to a location, first image data,
detect that a first face is represented in the first image data,
compare, using facial recognition processing, at least a portion of the first image data with at least first face data and second face data, wherein:
the first face data represents a second face and is associated with a first user account,
the second face data represents a third face and is associated with a second user account,
the second face and the third face are associated with different people, and
the first user account is different than the second user account, determine that the first face represented in the first image data corresponds to the second face represented in the first face data, determine, based at least in part on the first face corresponding to the second face, that the first user account is associated with the first face, determine that at least a first person associated with the first user account is allowed access to the location, determine, using the one or more cameras, that the first person is approaching an automated gate in the entrance, the automated gate configured to allow access to the location, and send an instruction to the automated gate to allow access to the location to be granted to the first person.

14. The system of claim 13, wherein the memory further comprises instructions that, when executed by the at least one processor, further cause the system to:

receive second image data corresponding to the automated gate;

detect that the first face is represented in the second image data; and determine that the first person is requesting access to the location.

15. The system of claim 13, wherein the memory further comprises instructions that, when executed by the at least one processor, further cause the system to:

receive, from the automated gate, a wireless signal output by a device associated with the first person; and determine, based at least in part on the wireless signal, that the first person is approaching the automated gate.

16. The system of claim 13, wherein the memory further comprises instructions that, when executed by the at least one processor, further cause the system to:

receive, from the one or more cameras, second image data corresponding to the entrance;

detect that a fourth face is represented in the second image data, the fourth face associated with a second person;

compare, using the facial recognition processing, at least a portion of the second image data with at least third face data representing a fifth face that is associated with a third user account, wherein:
the second face, the third face, and the fifth face are associated with different people, and
the third user account is different than each of the first user account and the second user account;

determine a confidence score that the fourth face corresponds to the fifth face;

determine that the confidence score is below a threshold;

request the second person to verify that the third user account associated with the second person;

verify that the second user account is associated with the second person;

determine that the second person is allowed access to the location;

associate the second person with a radio frequency identification signal;

cause access to the location to be granted to the second person; and track a position of the second person using the radio frequency identification signal.

17. The system of claim 13, wherein the memory further comprises instructions that, when executed by the at least one processor, further cause the system to:

receive, from the one or more cameras, second image data corresponding to the entrance;

detect that a fourth face is represented in the second image data, the fourth face associated with a second person;

comparing, using the facial recognition processing, at least a portion of the second image data with at least third face data representing a fifth face that is associated with a third user account, wherein:
the second face, the third face, and the fifth face are associated with different people, and
the third user account is different than each of the first user account and the second user account;

determine that the fourth face represented in the second image data corresponds to the fifth face represented in the third face data;

determine, based at least in part on the fourth face corresponding to the fifth face, that the third user account is associated with the fourth face;

determine a first number of people associated with the third user account that are authorized access to the location;

determine a second number of people associated with the third user account that have been provided access to the location;

determine that the first number is greater than the second number; and cause access to the location to be granted to the second person.

18. The system of claim 13, wherein the memory further comprises instructions that, when executed by the at least one processor, further cause the system to:

receive, from the one or more cameras, second image data corresponding to the entrance;

detect that a fourth face is represented in the second image data, the fourth face associated with a second person;

compare, using the facial recognition processing, at least a portion of the second image data with at least third face data representing a fifth face that is associated with a third user account, wherein:
the second face, the third face, and the fifth face are associated with different people, and
the third user account is different than each of the first user account and the second user account;

determine that the fourth face represented in the second image data corresponds to the fifth face represented in the third face data;

determine, based at least in part on the fourth face corresponding to the fifth face, that the third user account is associated with the fourth face;

determine a first number of people associated with the third user account that are authorized access to the location;

determine a second number of people associated with the third user account that have been provided access to the location;

determine that the first number is less than or equal to the second number; and cause access to the location to be denied to the second person.

19. The system of claim 13, wherein the memory further comprises instructions that, when executed by the at least one processor, further cause the system to, prior to receiving the first image data:

receive second image data;

detect that the second face is represented in the second image data;

determine, using the second image data, first characteristics associated with the second face;

associate the first characteristics with the first face data and the first user account;

retrieve third image data associated with the first user account;

detect that the second face is represented in the third image data;

determine, using the third image data, second characteristics associated with the second face;

associate the second characteristics with the first face data and the first user account;

determine changes between the first characteristics and the second characteristics; and update facial recognition data for a facial recognition algorithm based on the changes, the facial recognition algorithm configured to compare at least the portion of the first image data with at least the first face data based at least in part on the first characteristics and the second characteristics.

20. The system of claim 13, wherein the memory further comprises instructions that, when executed by the at least one processor, further cause the system to:

determine that the first user account is associated with the first face by further performing at least one of:

receiving a near-field communication signal output by a device associated with the first person;

receiving a radio frequency identification signal associated with the first person;

identifying the first person using a biometric device; and receiving account information from the first person, the account information verifying the first user account.

21. The computer-implemented method of claim 5, wherein the entrance to the location is a ticketless entrance configured to allow access to the location without requiring a physical ticket to be presented.

22. The computer-implemented method of claim 5, further comprising:

receiving second image data corresponding to the entrance;

detecting that a fourth face is represented in the second image data;

determining not to grant access to the location to a second person associated with the fourth face, wherein the determining further comprises at least one of:

i) determining that the fourth face is not associated with a user account, or ii) determining that a second user account is associated with the fourth face, and determining that no individual associated with the second user account is allowed access to the location; and causing access to the location to be denied to the second person.

\* \* \* \* \*